United States Patent
Yoshioka et al.

(10) Patent No.: US 12,549,289 B2
(45) Date of Patent: Feb. 10, 2026

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/246,133

(22) PCT Filed: Oct. 16, 2020

(86) PCT No.: PCT/JP2020/039195
§ 371 (c)(1),
(2) Date: Mar. 21, 2023

(87) PCT Pub. No.: WO2022/079922
PCT Pub. Date: Apr. 21, 2022

(65) Prior Publication Data
US 2023/0370204 A1    Nov. 16, 2023

(51) Int. Cl.
*H04L 1/1812* (2023.01)
*H04W 28/04* (2009.01)
*H04W 28/08* (2023.01)

(52) U.S. Cl.
CPC .......... *H04L 1/1812* (2013.01); *H04W 28/04* (2013.01); *H04W 28/0858* (2020.05)

(58) Field of Classification Search
CPC ... H04L 1/1812; H04L 1/1614; H04L 1/1854; H04L 1/1861; H04L 1/1887; H04L 1/1893; H04L 1/1896; H04L 5/0055; H04L 1/08; H04W 28/04; H04W 28/0858; H04W 4/40; H04W 92/18
See application file for complete search history.

(56) References Cited

U.S. PATENT DOCUMENTS

| | | | |
|---|---|---|---|
| 2019/0223205 A1* | 7/2019 | Papasakellariou | H04L 5/0057 |
| 2020/0137695 A1* | 4/2020 | Papasakellariou | H04W 72/23 |
| 2020/0228248 A1* | 7/2020 | Islam | H04L 1/1861 |
| 2020/0267597 A1* | 8/2020 | Huang | H04L 1/1812 |
| 2020/0313793 A1* | 10/2020 | Jung | H04L 5/0094 |
| 2021/0105766 A1* | 4/2021 | Wang | H04W 72/21 |

(Continued)

OTHER PUBLICATIONS

3GPP TSG RAN WG1 #101; R1-2004930 "Feature lead summary#2 for AI 7.2.4.5 Physical layer procedures for sidelink" Moderator (LG Electronics); e-Meeting; May 25-Jun. 5, 2020 (40 pages).

(Continued)

*Primary Examiner* — Steve N Nguyen
(74) *Attorney, Agent, or Firm* — Osha Bergman Watanabe & Burton LLP

(57) ABSTRACT

Provided is a terminal having: a transmitting unit configured to transmit to a base station a first uplink control channel including a HARQ (Hybrid Automatic Repeat Request) response related to a sidelink and an uplink shared channel; and a controlling unit configured to determine a process to be applied in a case where the first uplink control channel overlaps with the uplink shared channel at least in a time domain; wherein the transmitting unit transmits to the base station the first uplink control channel or the uplink shared channel, by applying the process.

5 Claims, 14 Drawing Sheets

(56) References Cited

U.S. PATENT DOCUMENTS

2021/0409182 A1* 12/2021 Lee ................. H04L 1/1864
2022/0158769 A1* 5/2022 Gou ................. H04W 72/23

OTHER PUBLICATIONS

3GPP TR 22.886 V15.1.0 "3rd Generation Partnership Project; Technical Specification Group Services and System Aspects; Study on enhancement of 3GPP Support for 5G V2X Services (Release 15)" Mar. 2017 (58 pages).
3GPP TS 38.211 V16.2.0 "3rd Generation Partnership Project; Technical Specification Group Radio Access Network; NR; Physical channels and modulation (Release 16)" Jun. 2020 (131 pages).
International Search Report issued in International Application No. PCT/JP2020/039195, mailed May 25, 2021 (3 pages).
Written Opinion issued in International Application No. PCT/JP2020/039195; Dated May 25, 2021 (3 pages).
Office Action issued in Japanese Application No. 2022-556828, mailed Jun. 4, 2024 (5 pages).
Office Action issued in European Application No. 20957751.9, dated Jun. 17, 2024 (8 pages).
3GPP TSG RAN WG1 Meeting #101-e; R1-2003498; Huawei, HiSilicon; "Remaining details of physical layer procedures for sidelink"; E-meeting, May 25-Jun. 5, 2020 (15 pages).
3GPP TSG RAN WG1 #101; R1-2003952; CMCC; "Remaining issues on physical layer procedures for sidelink"; e-Meeting, May 25-Jun. 5, 2020 (8 pages).
Office Action issued in Chinese Application No. 202080106040.8, dated Jun. 24, 2024 (16 pages).
Office Action issued in Japanese Patent Application No. 2022-556828, dated Nov. 5, 2024 (5 pages).
Office Action issued in Vietnamese Patent Application No. 1-2023-02424, dated Aug. 8, 2025 (5 pages).

* cited by examiner

TERMINAL AND COMMUNICATION METHOD

TECHNICAL FIELD

The present invention relates to a terminal and a communication method in a wireless communication system.

BACKGROUND

In LTE (Long Term Evolution) and LTE successor systems (for example, LTE-A (LTE Advanced), NR (New Radio) (also referred to as 5G)), a D2D (Device to Device) technology in which terminals communicate directly with each other without using base stations, is being discussed (for example, Non-Patent Reference 1).

The D2D reduces traffic between the terminals and the base stations and enables communication between the terminals even when the base stations are unable to perform communications during a disaster, or the like. Note that, in the 3GPP (3rd Generation Partnership Project), D2D is referred to as "sidelink", but the more generic term, D2D is used herein. However, in the description of embodiments below, the sidelink is also used as needed.

The D2D communication is broadly classified into D2D discovery for discovering other terminals capable of communication and D2D communication (also referred to as D2D direct communication, D2D communication, direct communication between terminals, etc.) for communicating directly between terminals. Hereinafter, when D2D communication and D2D discovery are not specifically distinguished, it is simply called D2D. Also, a signal transmitted and received by D2D is called a D2D signal. Various use cases of V2X (Vehicle to Everything) services in NR have been discussed (for example, Non-Patent Reference 2).

RELATED ART

Non-Patent Reference

[Non-Patent Reference 1] 3GPP TS 38.211 V16.2.0 (2020-06)
[Non-Patent Reference 2] 3GPP TR 22.886 V15.1.0 (2017-03)

SUMMARY

Technical Problem

In NR Sidelink, SL (Sidelink) HARQ (Hybrid Automatic Repeat Request) feedback is supported. An SL-HARQ-ACK can be transmitted from a terminal to a base station via a PUCCH (Physical Uplink Control Channel) or a PUSCH (Physical Uplink Shared Channel) that is determined based on instructions or settings from a base station. However, the terminal operation in a case where a PUCCH containing an SL-HARQ-ACK overlaps with a PUSCH in a time domain, is not clear.

The present invention has been made in view of the above aspects, and the object of the present invention is to determine a process for a case in which a channel carrying a HARQ (Hybrid Automatic Repeat Request) feedback related to a direct communication between terminals, overlaps with another channel in a time domain.

Solution to Problem

According to the disclosed technology, provided is a terminal having: a transmitting unit configured to transmit to a base station a first uplink control channel including a HARQ (Hybrid Automatic Repeat Request) response related to a sidelink and an uplink shared channel; and a controlling unit configured to determine a process to be applied in a case where the first uplink control channel overlaps with the uplink shared channel at least in a time domain; wherein the transmitting unit transmits to the base station the first uplink control channel or the uplink shared channel, by applying the process.

Beneficial Effect of the Invention

According to the disclosed technology, it is possible to determine a process for a case in which a channel carrying a HARQ (Hybrid automatic repeat request) feedback related to a direct communication between terminals, overlaps with another channel in a time domain.

DETAILED DESCRIPTION

Embodiments of the present invention are described below with reference to the drawings. It should be noted that the embodiments described below are examples and the embodiments to which the present invention is applied are not limited to the following embodiments.

Conventional technologies are appropriately used in the operation of the wireless communication system according to an embodiment of the present invention. However, the conventional technologies include, for example, a conventional LTE, but are not limited to the conventional LTE. Further, the term "LTE" used herein should have a broad meaning including LTE-Advanced and techniques after LTE-Advanced (for example, NR) or wireless LAN (Local Area Network) unless otherwise specified.

Further, in the embodiments of the present invention, a duplexing system may be a TDD (Time Division Duplexing) system, an FDD (Frequency Division Duplexing) system, or any other system (for example, Flexible Duplexing system).

Further, in the embodiments of the present invention, in order to configure a wireless parameter or the like, a predetermined value may be pre-configured, or a wireless parameter may be indicated by a base station 10 or a terminal 20, or may be pre-defined by technical specifications.

Figure 1:
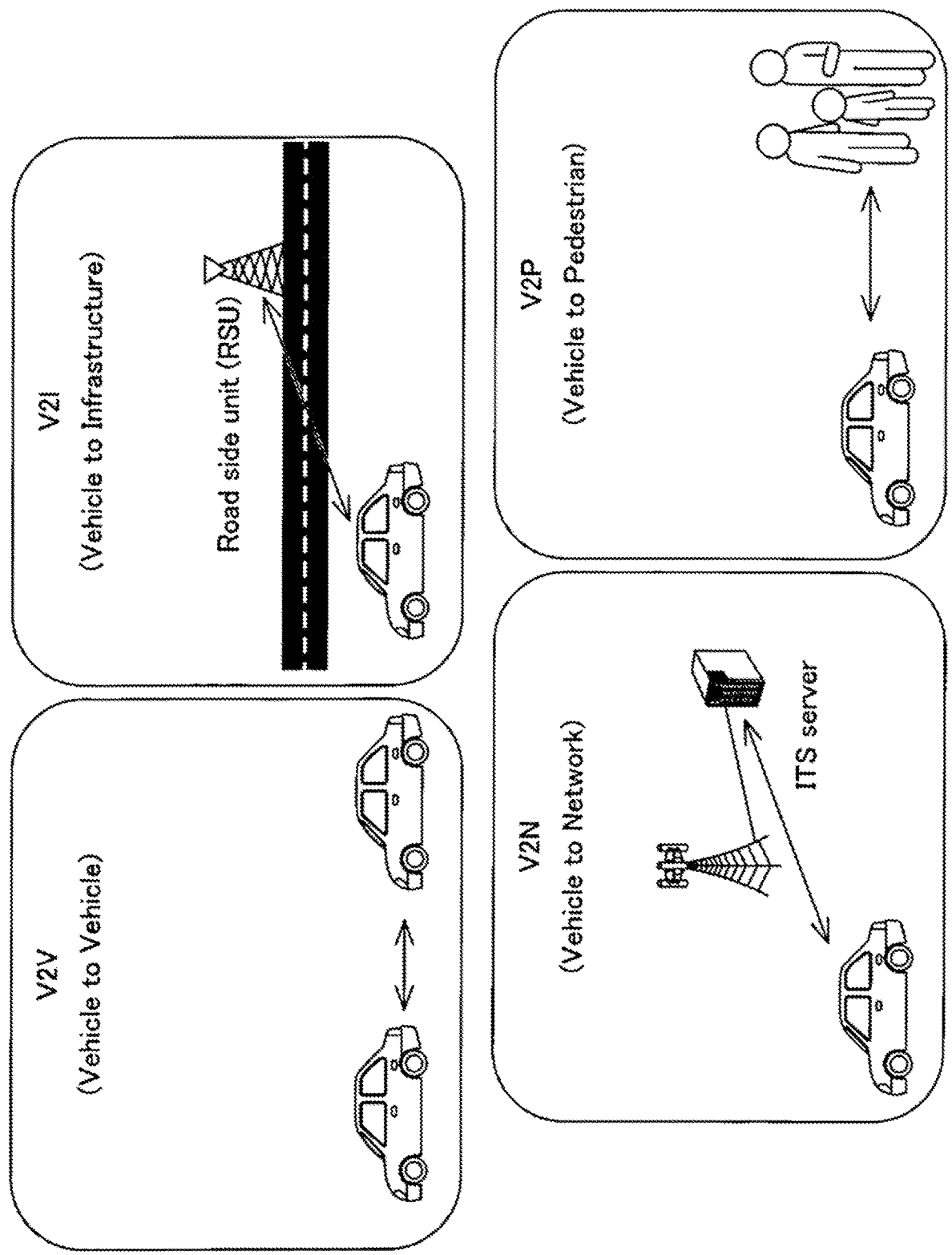
FIG. 1 is a diagram illustrating V2X.

FIG. 1 is a diagram illustrating V2X. In 3GPP, enhancement of D2D functions for implementing V2X (Vehicle to Everything) or eV2X (enhanced V2X) has been discussed and specifications are being developed. As shown in FIG. 1, V2X is a part of ITS (Intelligent Transport Systems) and is a generic name for V2V (Vehicle to Vehicle) referring to a form of communication performed between vehicles; V2I (Vehicle to Infrastructure) referring to a form of communication performed between a vehicle and a road-side unit (RSU) installed on roadside; V2N (Vehicle to Network) referring to a form of communication performed between a vehicle and an ITS server; and V2P (Vehicle to Pedestrian) referring to a form of communication performed between a vehicle and a mobile terminal that is held by a pedestrian.

In addition, in 3GPP, V2X using LTE/NR's cellular communication and communication between terminals has been discussed. V2X using cellular communication may be referred to as cellular V2X. In NR V2X, discussions are ongoing to realize higher capacity, reduced latency, higher reliability, and QoS (Quality of Service) control.

It is assumed that discussions with regard to LTE/NR V2X that may not be limited to 3GPP specifications will also be performed in the future. For example, it is assumed that the following will be discussed: how to secure interoperability; how to reduce cost by implementing higher layers; how to use or how to switch a plurality of RATs (Radio Access Technologies); how to handle regulations of each country; how to acquire and deliver data of an LTE/NR V2X platform; and how to manage and utilize databases.

In an embodiment of the present invention, a form in which communication apparatuses are mounted on vehicles is mainly assumed. However, an embodiment of the present invention is not limited to such a form. For example, communication apparatuses may be terminals carried by people, may be apparatuses mounted on drones or aircrafts, or may be base stations, RSUs, relay stations (relay nodes), terminals capable of scheduling, and the like.

Note that, SL (Sidelink) may be distinguished from UL (Uplink) or DL (Downlink) based on any one of, or any combination of the following 1) to 4). In addition, SL may have a different name.
1) Resource allocation in the time domain
2) Resource allocation in the frequency domain
3) Synchronization signals to be referred to (including SLSS (Sidelink Synchronization Signal))
4) Reference signal used for path-loss measurement for transmission power control In addition, with regard to OFDM (Orthogonal Frequency Division Multiplexing) of SL or UL, any of CP-OFDM (Cyclic-Prefix OFDM), DFT-S-OFDM (Discrete Fourier Transform-Spread-OFDM), OFDM without Transform precoding, and OFDM with Transform precoding may be applied.

In LTE SL, with regard to allocating SL resources to the terminals 20, a Mode 3 and a Mode 4 are specified. In Mode 3, the transmission resources are dynamically allocated using DCI (Downlink Control Information) that is transmitted from a base station 10 to a terminal 20. In addition, in Mode 3, SPS (Semi Persistent Scheduling) is also available. In Mode 4, a terminal 20 autonomously selects transmission resources from a resource pool.

Note that a slot in an embodiment of the present invention may be read as a symbol, a mini slot, a subframe, a radio frame, or a TTI (Transmission Time Interval). In addition, a cell in an embodiment of the present invention may be read as a cell group, a carrier component, a BWP, a resource pool, a resource, a RAT (Radio Access Technology), a system (including a wireless LAN), and the like.

Note that, in an embodiment of the present invention, the terminal 20 is not limited to V2X terminals, but may be any type of terminal that performs D2D communication. For example, the terminal 20 may be a terminal that is held by a user, such as a smartphone, or may be an IoT (Internet of Things) device such as a smart meter.

Figure 2:
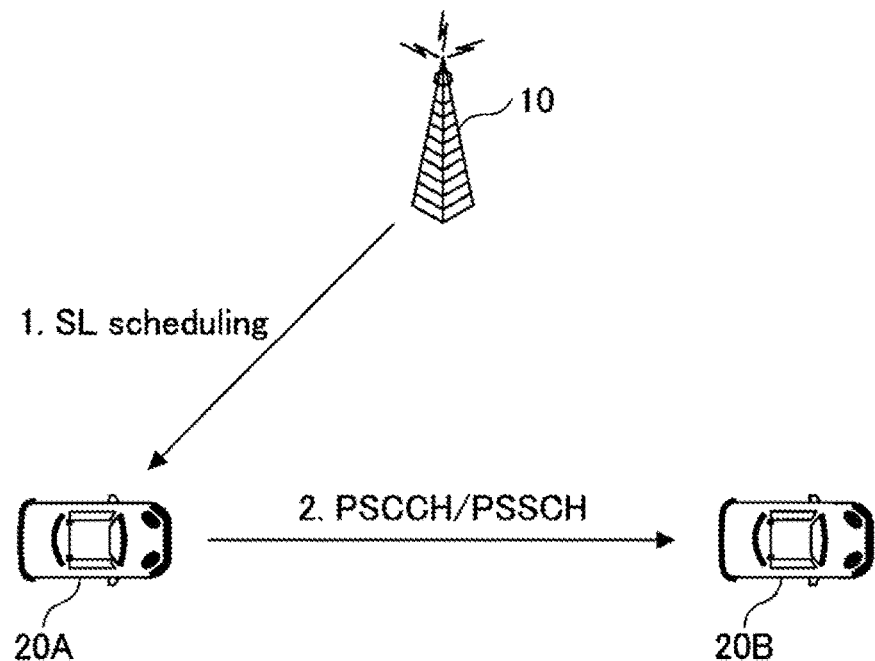
FIG. 2 is a diagram illustrating an example (1) of a V2X transmission mode.

FIG. 2 is a diagram illustrating an example (1) of a V2X transmission mode. In the transmission mode of the sidelink communication shown in FIG. 2, in step 1, a base station 10 transmits sidelink scheduling to a terminal 20A. Next, the terminal 20A transmits PSCCH (Physical Sidelink Control Channel) and PSSCH (Physical Sidelink Shared Channel) to a terminal 20B based on the received scheduling (step 2). The transmission mode of the sidelink communication shown in FIG. 2 may be called a sidelink transmission mode 3 in LTE. In the sidelink transmission mode 3 in LTE, Uu based sidelink scheduling is performed. Uu is a radio interface between UTRAN (Universal Terrestrial Radio Access Network) and UE (User Equipment). Note that, the transmission mode of the sidelink communication shown in FIG. 2 may be referred to as a sidelink transmission mode 1 in NR.

Figure 3:
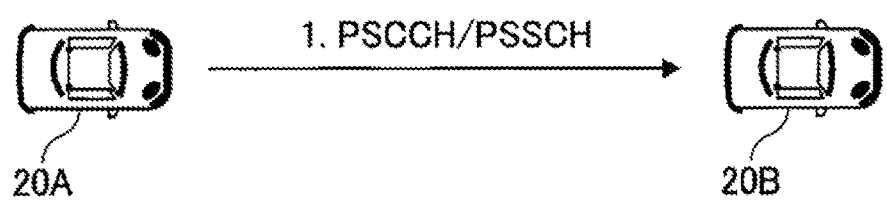
FIG. 3 is a diagram illustrating an example (2) of a V2X transmission mode.

FIG. 3 is a diagram illustrating an example (2) of a V2X transmission mode. In the transmission mode of the sidelink communication shown in FIG. 3, in step 1, a terminal 20A transmits PSCCH and PSSCH to a terminal 20B using autonomously selected resources. The transmission mode of the sidelink communication shown in FIG. 3 may be called a sidelink transmission mode 4 in LTE. In the sidelink transmission mode 4 in LTE, the UE itself performs resource selection.

Figure 4:
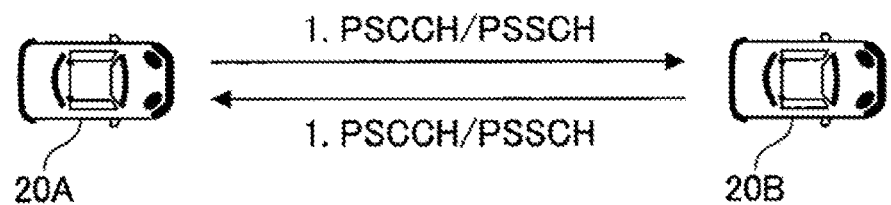
FIG. 4 is a diagram illustrating an example (3) of a V2X transmission mode.

FIG. 4 is a diagram illustrating an example (3) of a V2X transmission mode. In the transmission mode of the sidelink communication shown in FIG. 4, in step 1, a terminal 20A transmits PSCCH and PSSCH to a terminal 20B using autonomously selected resources. Similarly, the terminal 20B transmits PSCCH and PSSCH to the terminal 20A using autonomously selected resources (step 1). The transmission mode of the sidelink communication shown in FIG. 4 may be called a sidelink transmission mode 2a in NR. In the sidelink transmission mode 2 in NR, the terminal 20 itself performs resource selection.

Figure 5:
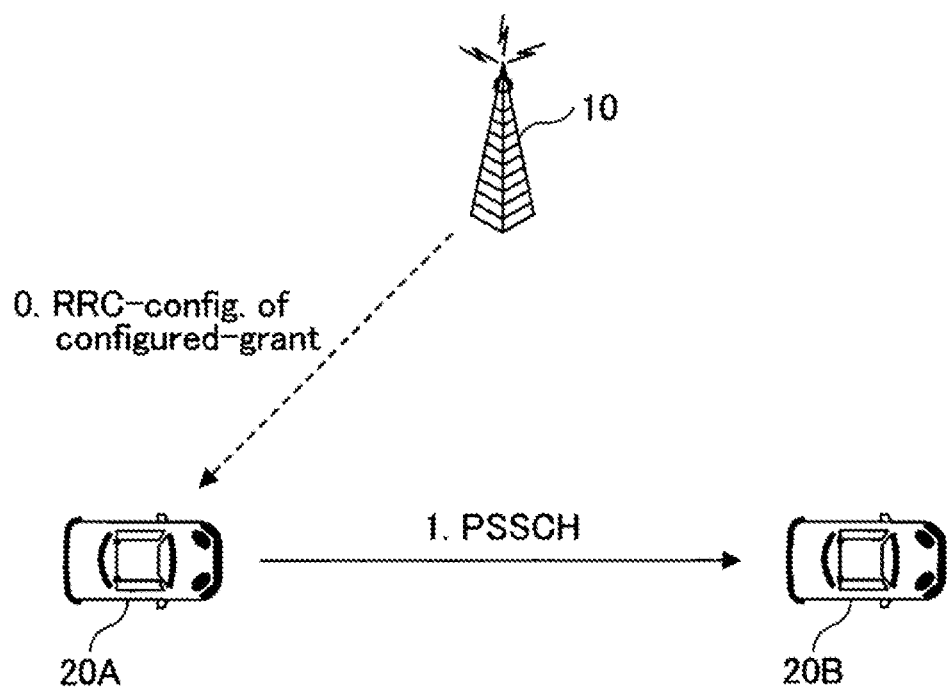
FIG. 5 is a diagram illustrating an example (4) of a V2X transmission mode.

FIG. 5 is a diagram illustrating an example (4) of a V2X transmission mode. In the transmission mode of the sidelink communication shown in FIG. 5, in step 0, a sidelink resource pattern is transmitted from a base station 10 to a terminal 20A via RRC (Radio Resource Control) settings, or is set in advance. Next, the terminal 20A transmits PSSCH to a terminal 20B based on the resource pattern (step 1). The transmission mode of the sidelink communication shown in FIG. 5 may be called a sidelink transmission mode 2c in NR.

Figure 6:
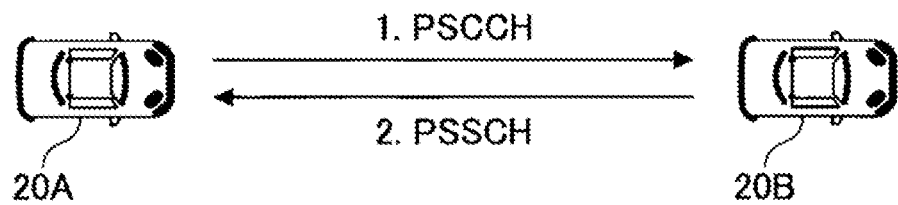
FIG. 6 is a diagram illustrating an example (5) of a V2X transmission mode.

FIG. 6 is a diagram illustrating an example (5) of a V2X transmission mode. In the transmission mode of the sidelink communication shown in FIG. 6, in step 1, a terminal 20A transmits a sidelink scheduling to a terminal 20B via PSCCH. Next, the terminal 20B transmits PSSCH to the terminal 20A based on the received scheduling (step 2). The transmission mode of the sidelink communication shown in FIG. 6 may be called a sidelink transmission mode 2d in NR.

Figure 7:
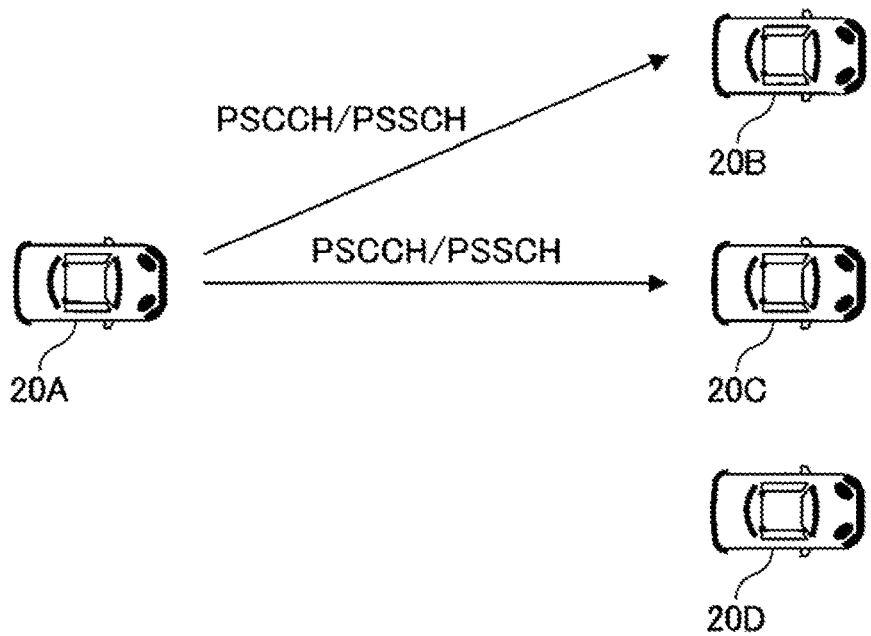
FIG. 7 is a diagram illustrating an example (1) of a V2X communication type.

FIG. 7 is a diagram illustrating an example (1) of a V2X communication type. The sidelink communication type shown in FIG. 7 is unicast. A terminal 20A transmits PSCCH and PSSCH to a terminal 20. In the example shown in FIG. 7, the terminal 20A performs unicast to a terminal 20B, and performs unicast to a terminal 20C.

Figure 8:
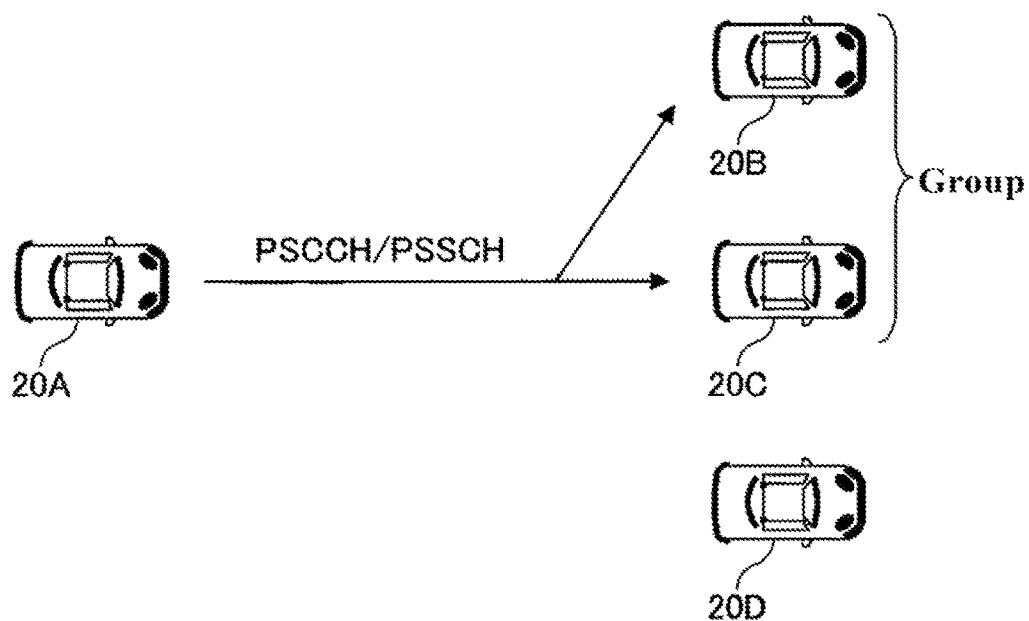
FIG. 8 is a diagram illustrating an example (2) of a V2X communication type.

FIG. 8 is a diagram illustrating an example (2) of a V2X communication type. The sidelink communication type shown in FIG. 8 is group-cast. A terminal 20A transmits PSCCH and PSSCH to a group to which one or more terminals 20 belong. In the example shown in FIG. 8, the group includes a terminal 20B and a terminal 20C, and the terminal 20A performs groupcast to the group.

Figure 9:
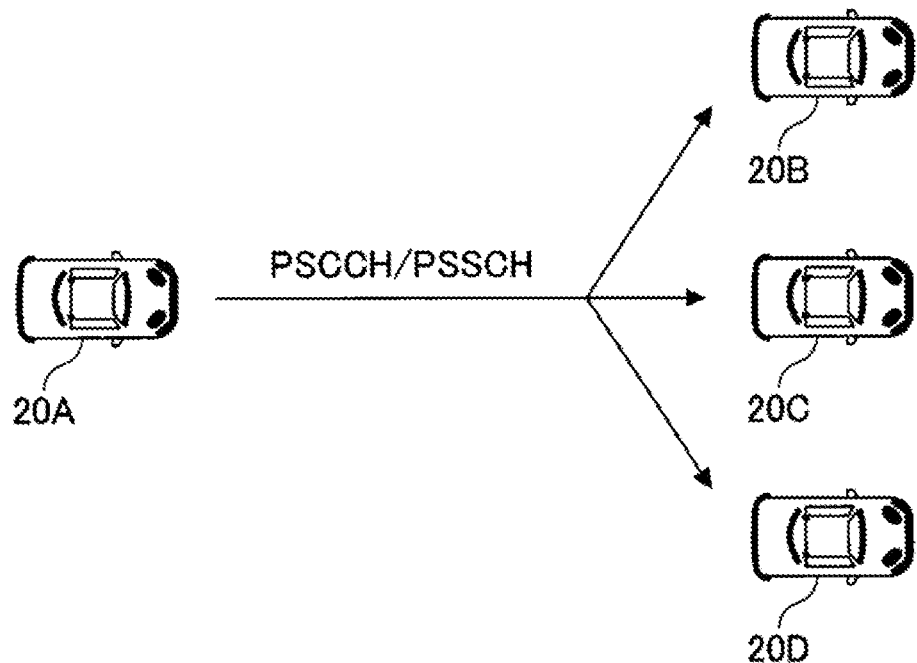
FIG. 9 is a diagram illustrating an example (3) of a V2X communication type.

FIG. 9 is a diagram illustrating an example (3) of a V2X communication type. The sidelink communication type shown in FIG. 9 is broadcast. A terminal 20A transmits PSCCH and PSSCH to one or more terminals 20. In the example shown in FIG. 9, the terminal 20A performs broadcast to a terminal 20B, a terminal 20C, and a terminal 20D. Note that, the terminals 20A shown in FIG. 7 to FIG. 9 may be referred to as a header-UE.

In addition, in NR-V2X, it is assumed that HARQ (Hybrid automatic repeat request) is supported for unicasts and groupcasts of sidelinks. Furthermore, in NR-V2X, SFCI (Sidelink Feedback Control Information) including an HARQ response is defined. Furthermore, the transmission of SFCI via PSFCH (Physical Sidelink Feedback Channel) is also under consideration.

Note that, in the following description, PSFCH is used for transmitting a sidelink HARQ-ACK. However, this is just an example. For example, PSCCH may be used to transmit a sidelink HARQ-ACK, PSSCH may be used to transmit a sidelink HARQ-ACK, or other channels may be used to transmit a sidelink HARQ-ACK.

Hereafter, for the sake of convenience, the overall information reported by the terminal 20 in HARQ may be called HARQ-ACK. This HARQ-ACK may also be referred to as HARQ-ACK information. More specifically, the codebook applied to the HARQ-ACK information reported from the terminal to a base station 10 and the like, is called the HARQ-ACK codebook. The HARQ-ACK codebook defines a bit sequence of HARQ-ACK information. Note that, NACK is also transmitted in addition to ACK by "HARQ-ACK".

Figure 10:
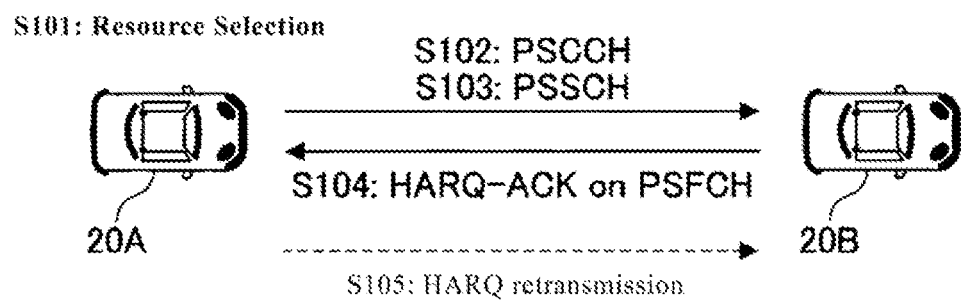
FIG. 10 is a sequence chart showing an example (1) of V2X operation.

FIG. 10 is a sequence chart showing an example (1) of V2X operation. As shown in FIG. 10, the wireless communication system according to an embodiment of the present invention may have a terminal 20A and a terminal 20B. Note that, there are many user apparatuses in actuality; however, FIG. 10 shows the terminal 20A and the terminal 20B as examples.

Hereafter, when the terminals 20A, 20B and the like are not particularly distinguished, they are simply described as "terminals 20" or "user apparatuses". FIG. 10 illustrates, as an example, the case where the terminal 20A and the terminal 20B are both in cell coverage, but the operation according to an embodiment of the present invention is also applicable when the terminal 20B is outside of coverage.

As mentioned above, in an embodiment of the present invention, the terminal 20 is, for example, a device installed in a vehicle, such as an automobile, and has a function of cellular communication as a UE in LTE or NR and a sidelink function. The terminal 20 may be a conventional portable terminal (such as a smartphone). The terminal 20 may also be an RSU. Such RSU may be a UE-type RSU having the function of a UE or a gNB-type RSU having the function of a base station apparatus.

Note that, the terminal 20 need not be a single housing device. For example, even if various sensors are distributed throughout the vehicle, the device including the various sensors may be the terminal 20.

In addition, the processing contents of the transmission data of sidelink of the terminal 20 are basically the same as the processing contents of the UL transmission in LTE or NR. For example, the terminal 20 scrambles the code words of the transmission data, modulates them to generate complex-valued symbols, and maps the complex-valued symbols (transmission signals) to one or two layers for precoding. The precoded complex-valued symbols are then mapped to resource elements to generate a transmission signal (for example, complex-valued time-domain SC-FDMA signal), which is transmitted from each antenna port.

Note that, the base station 10 has a function of cellular communication as a base station in LTE or NR, and a function to enable the communication of the terminal 20 according to the present embodiment (for example, resource pool configuration, and resource allocation). In addition, the base station 10 may be an RSU (gNB-type RSU).

In addition, in a wireless communication system according to an embodiment of the present invention, a signal waveform used by the terminal 20 for SL or UL may be OFDMA, SC-FDMA, or other signal waveform.

In step S101, the terminal 20A autonomously selects resources to be used for PSCCH and PSSCH from a resource selection window having a predetermined time period. The resource selection window may be configured from the base station 10 to the terminal 20. Here, with regard to the predetermined time period of the resource selection window, the period may be defined by the terminal implementation conditions, such as processing time or maximum allowable packet delay time, or the period may be defined in advance by specifications, or the predetermined time period may be called an interval in the time domain.

In step S102 and step S103, the terminal 20A transmits SCI (Sidelink Control Information) by PSCCH and/or PSSCH and SL data by PSSCH, using the resources selected autonomously in the step S101. For example, the terminal 20A may transmit the PSCCH using a frequency resource adjacent to the frequency resource of the PSSCH in the same time resource as at least part of the time resource of the PSSCH.

A terminal 20B receives the SCI (PSCCH and/or PSSCH) and SL data (PSSCH) transmitted from the terminal 20A. The received SCI may include information of the PSFCH resources for the terminal 20B to transmit an HARQ-ACK for receiving such data. The terminal 20A may include information of the autonomously selected resources in the SCI and transmit the SCI.

In step S104, the terminal 20B transmits an HARQ-ACK for the received data to the terminal 20A using the resources of the PSFCH determined from the received SCI.

In step S105, the terminal 20A retransmits the PSCCH and PSSCH to the terminal 20B if the HARQ-ACK received in step S104 indicates that retransmission is requested, i.e., in the case of NACK (negative response). The terminal 20A may retransmit the PSCCH and PSSCH using autonomously selected resources.

Note that, if the HARQ control with HARQ feedback is not performed, the steps S104 and S105 need not be performed.

Figure 11:
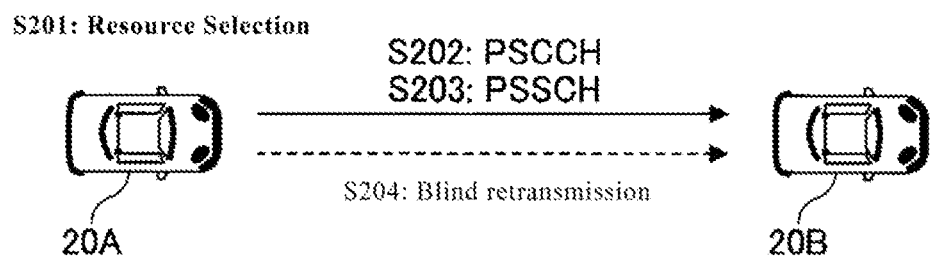
FIG. 11 is a sequence chart showing an example (2) of V2X operation.

FIG. 11 is a sequence chart showing an example (2) of V2X operation. A blind retransmission without HARQ control may be performed to improve transmission success rate or reachability.

In step S201, a terminal 20A autonomously selects resources to be used for PSCCH and PSSCH from a resource selection window having a predetermined time period. The resource selection window may be configured from the base station 10 to the terminal 20.

In step S202 and step S203, the terminal 20A transmits SCI by PSCCH and/or PSSCH and SL data by PSSCH, using the resources selected autonomously in step S201. For example, the terminal 20A may transmit the PSCCH using a frequency resource adjacent to the frequency resource of the PSSCH in the same time resource as at least part of the time resource of the PSSCH.

In step S204, the terminal 20A retransmits the SCI by PSCCH and/or PSSCH and the SL data by PSSCH to the terminal 20B, using the resources selected autonomously in step S201. The retransmission in step S204 may be performed a plurality of times.

Note that, if blind retransmission is not performed, step S204 need not be performed.

Figure 12:
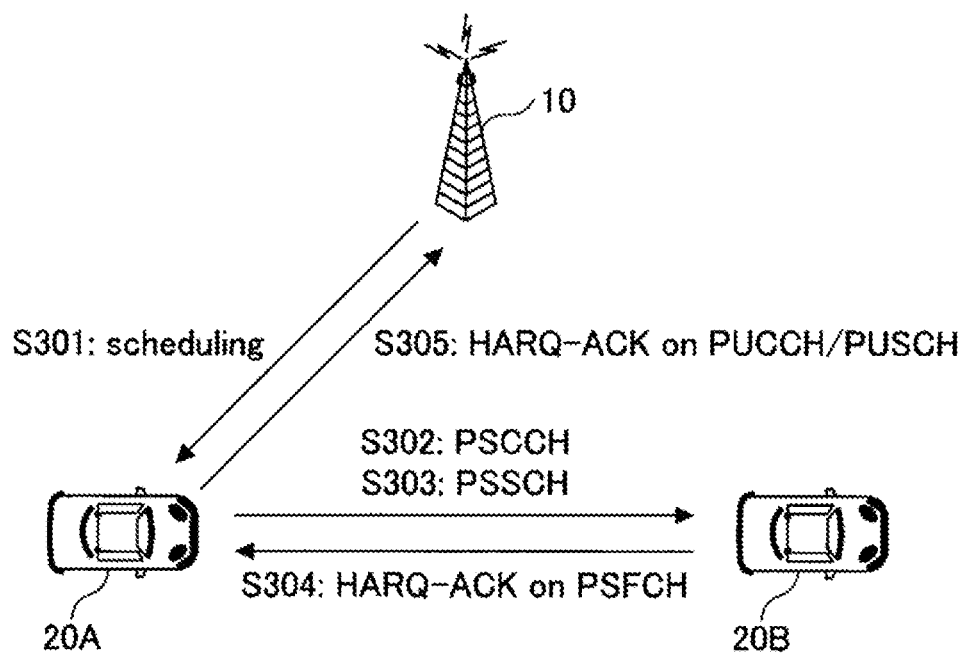
FIG. 12 is a sequence chart showing an example (3) of V2X operation.

FIG. 12 is a sequence chart showing an example (3) of V2X operation. A base station 10 may perform sidelink scheduling. That is, the base station 10 may determine the resources of the sidelink to be used by a terminal 20 to transmit information indicating such resources to a terminal 20. Furthermore, if HARQ control with HARQ feedback is applied, the base station may transmit information indicating the resources of PSFCH to the terminal 20.

In step S301, the base station 10 performs SL scheduling by transmitting DCI (Downlink Control Information) to a terminal 20A by PDCCH. Hereafter, for the sake of convenience, the DCI for SL scheduling is called SL scheduling DCI.

In addition, in step S301, it is assumed that the base station 10 also transmits DCI for DL scheduling (which may be called DL allocation) to the terminal 20A by PDCCH. Hereafter, for the sake of convenience, the DCI for DL scheduling is called DL scheduling DCI. The terminal 20A that has received the DL scheduling DCI receives DL data by PDSCH using the resources specified in the DL scheduling DCI.

In step S302 and step S303, the terminal 20A transmits SCI (Sidelink Control Information) by PSCCH and/or PSSCH and SL data by PSSCH, using the resources specified in the SL scheduling DCI. Note that, only the resources of PSSCH may be specified in the SL scheduling DCI. In this case, for example, the terminal 20A may transmit the PSCCH using a frequency resource adjacent to the frequency resource of the PSSCH in the same time resource as at least part of the time resource of the PSSCH.

A terminal 20B receives the SCI (PSCCH and/or PSSCH) and SL data (PSSCH) transmitted from the terminal 20A. The SCI received by the PSCCH and/or PSSCH includes information of the resources of the PSFCH for the terminal 20B to transmit an HARQ-ACK for receiving such data.

The information of the resource is included in the DL scheduling DCI or SL scheduling DCI transmitted from the base station 10 in step S301, and the terminal 20A obtains the information of the resource from the DL scheduling DCI or SL scheduling DCI and includes it in the SCI. Alternatively, the DCI transmitted from the base station 10 may not include information of the resource, and the terminal 20A may autonomously include information of the resource in the SCI and then transmit it.

In step S304, the terminal 20B transmits an HARQ-ACK for the received data to the terminal 20A using the resources of the PSFCH determined from the received SCI.

In step S305, the terminal 20A transmits an HARQ-ACK at the timing (for example, slot unit timing) specified by the DL scheduling DCI (or SL scheduling DCI) using the PUCCH (Physical uplink control channel) resource specified by the DL scheduling DCI (or the SL scheduling DCI), and the base station 10 receives the HARQ-ACK. The codebook of the HARQ-ACK may include an HARQ-ACK generated based on an HARQ-ACK received from the terminal 20B or a PSFCH not received, and an HARQ-ACK for DL data. However, when there is no DL data allocation and the like, the HARQ-ACK for DL data is not included. In NR Rel. 16, the codebook of the HARQ-ACK does not include the HARQ-ACK for DL data.

Note that, if HARQ control with HARQ feedback is not performed, step S304 and/or step S305 may not be performed.

Figure 13:
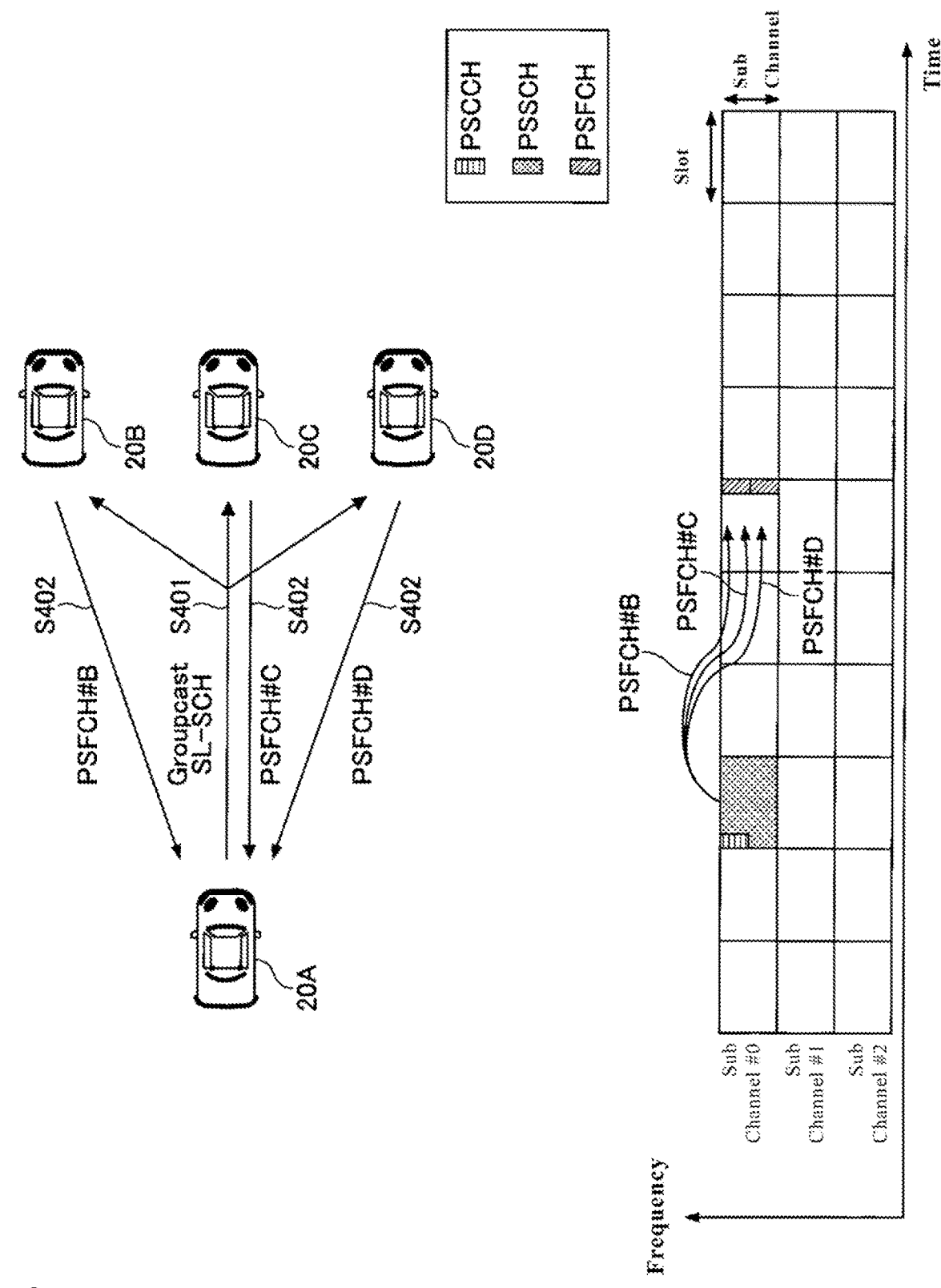
FIG. 13 is a sequence chart showing an example (4) of V2X operation.

FIG. 13 is a sequence chart showing an example (4) of V2X operation. In the NR sidelink as described above, the transmission of an HARQ response is supported by PSFCH. Note that, a PSFCH format that can be used is the same as, for example, PUCCH format 0. That is, the PSFCH format may be a sequence-based format where the PRB (Physical Resource Block) size is 1 and an ACK and an NACK are identified by sequence and/or cyclic shift differences. The PSFCH format is not limited to this. The PSFCH resources may be placed in the last symbol or last plurality of symbols of a slot. In addition, a period N may be set for or predefined for the PSFCH resources. The period N may be set or predefined in slot units.

In FIG. 13, the vertical axis corresponds to the frequency domain and the horizontal axis corresponds to the time domain. PSCCH may be placed in one symbol at the beginning of a slot, in a plurality of symbols from the beginning, or in a plurality of symbols from a symbol other than at the beginning. PSFCH may be placed in one symbol at the end of the slot or in a plurality of symbols at the end of the slot. Note that, with respect to the aforementioned "beginning of the slot" and "end of the slot", discussion about symbols for AGC (Automatic Gain Control) and symbols for transmission/reception switching may be omitted. That is, for example, if a slot is comprised of 14 symbols, "beginning of the slot" and "end of the slot" may mean that they are the first and last symbols from among the 12 symbols, excluding the first and last symbols, respectively. In an example shown in FIG. 13, three subchannels are set in the resource pool, and two PSFCHs are placed three slots after the slot in which the PSSCH is placed. The arrows from PSSCH to PSFCH show examples of PSFCHs associated with PSSCHs.

If an HARQ response in the NR-V2X groupcast is groupcast option 2 that transmits an ACK or NACK, it is necessary to determine the resources to be used for transmission and reception of PSFCH. As shown in FIG. 13, in step S401, a terminal 20A, which is a transmission side terminal 20, performs groupcast to terminals 20B, 20C, and 20D, which are reception side terminals, via SL-SCH. Next, in step S402, the terminal 20B uses PSFCH #B, the terminal 20C uses PSFCH #C, and the terminal 20D uses PSFCH #D to transmit the HARQ response to the terminal 20A. Here, as shown in the example in FIG. 13, if the number of available PSFCH resources is less than the number of reception side terminals belonging to the group, it is necessary to determine how to allocate the PSFCH resources. Note that, the transmission side terminals 20 may be aware of the number of reception side terminals 20 in groupcast. Note that, in the groupcast option 1, only an NACK is transmitted as an HARQ response, and an ACK is not transmitted.

With a Release 16 NR Sidelink, an SL-HARQ-ACK can be reported to a base station 10. A terminal 20 transmits an SL-HARQ-ACK to a base station based on a PUCCH determined based on instructions or settings from the base station 10. In addition, the terminal 20 can transmit an SL-HARQ-ACK to the base station 10 via a PUSCH.

Multiplexing a Uu-UCI (which may be at least one of a DL-HARQ-ACK, an SR, and a CSI) with an SL-HARQ-ACK into the same channel is not supported. A terminal operation is not necessarily clear in a case where a PUCCH carrying an SL-HARQ-ACK overlaps with a PUSCH at least in a time domain, because a Uu-UCI may also be multiplexed with the PUSCH. Similarly, a terminal operation in a case where a PSCCH/PSSCH transmission overlaps with a part of a UL transmission at least in a time domain, has not been clear.

A processing method in a case where a PUCCH containing an SL-HARQ-ACK overlaps with a PUSCH, the PUCCH and the PUSCH being transmitted by a terminal 20, at least in a time domain, is described below.

Figure 14:
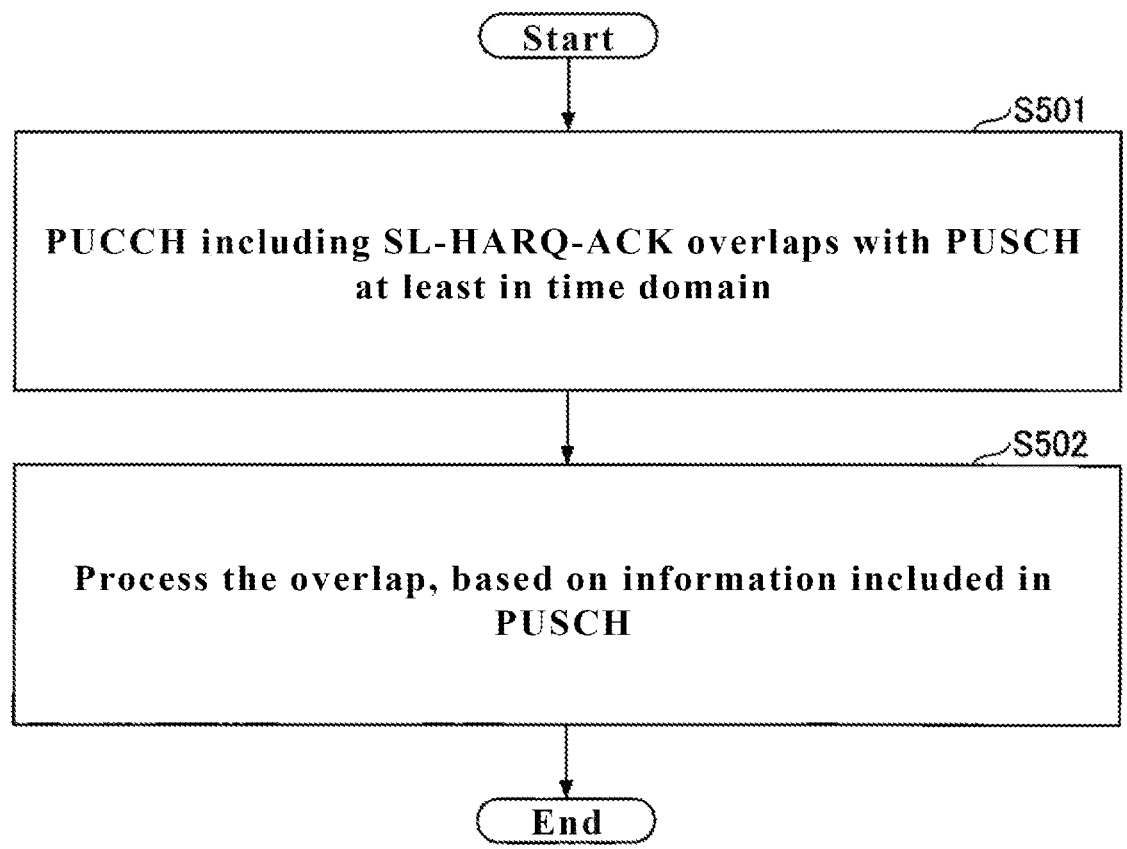
FIG. 14 is a flowchart illustrating an example of a process related to channel overlapping according to an embodiment of the present invention.

FIG. 14 is a flowchart illustrating an example of a process related to channel overlapping according to an embodiment of the present invention. In step S501, a terminal 20 detects that a PUCCH containing an SL-HARQ-ACK overlaps with a PUSCH at least in a time domain. In the subsequent step S502, a terminal 20 processes the overlap based on information contained in the PUSCH.

Figure 15:
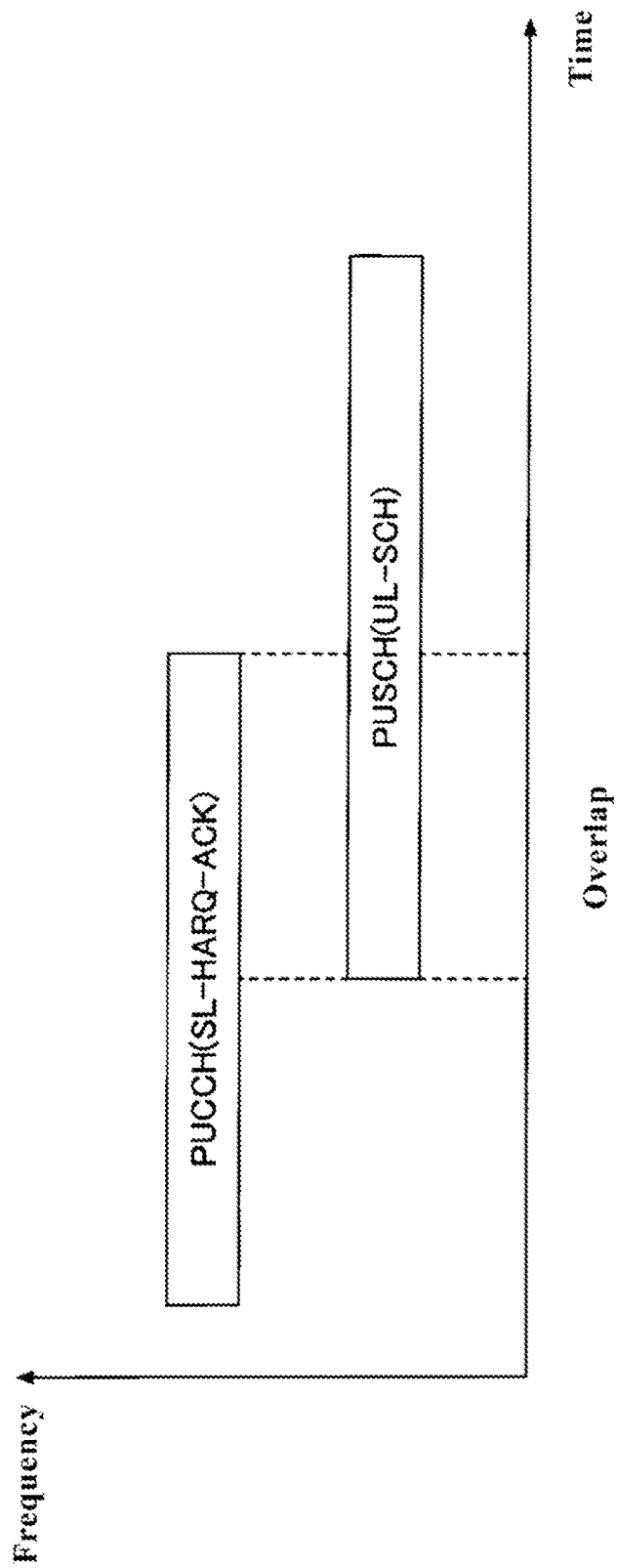
FIG. 15 is a diagram showing an example (1) of channel overlapping according to an embodiment of the present invention.

FIG. 15 is a diagram showing an example (1) of channel overlapping according to an embodiment of the present invention. As shown in FIG. 15, in a case where a PUSCH, which collides with a PUCCH that contains an SL-HARQ-ACK, contains a UL-SCH and does not contain a UCI, a terminal 20 may multiplex the SL-HARQ-ACK with the PUSCH in step S502 shown in FIG. 14. Note that, collision means overlapping at least in a time domain. Note that, the UL-SCH can be information in a higher layer such as MAC PDU or MAC CE, and can also be referred to as data.

Further, in step S502 shown in FIG. 14, the terminal 20 may multiplex an SL-HARQ-ACK with a PUSCH when respective priorities of: a PUCCH, or an SL-HARQ-ACK contained in the PUCCH; and a PUSCH, or a UL-SCH contained in the PUSCH, satisfy a predetermined condition, and the terminal 20 may drop one of them when the respective priorities do not satisfy the predetermined condition. Note that, in an embodiment of the present invention, control based on priority can be replaced with control based on a transmission start symbol, or control based on a cell index.

For example, when a PUSCH has a priority index 1 in a PHY layer and the RRC parameter sl-PriorityThresholdU-LURLLC is provided, and when the smallest priority index contained in a PUCCH is smaller than sl-PriorityThresholdULURLLC, the terminal 20 may multiplex the SL-HARQ-ACK with the PUSCH, and when the smallest priority index contained in a PUCCH is not smaller than sl-PriorityThresholdULURLLC, the terminal 20 may drop the PUCCH and transmit the PUSCH. Note that, the smaller the value or index indicating a priority related to an SL HARQ-ACK is, the higher the priority may be. For a value or index indicating the priority of a PHY layer related to PUSCH, the larger the value or index is, the higher the priority may be.

A PUSCH may have a priority index 1 for a PHY layer, and when the RRC parameter sl-PriorityThresholdU-LURLLC has not been provided, the terminal 20 may drop the PUCCH and transmit the PUSCH.

When a PUSCH does not have a priority index 1 in a PHY layer (e.g., the priority index in a PHY layer is 0), and when the lowest priority index contained in a PUCCH is smaller than sl-PriorityThresholdULURLLC, the terminal 20 may multiplex SL-HARQ-ACK with the PUSCH, and when the lowest priority index contained in the PUCCH is not smaller than sl-PriorityThresholdULURLLC, the terminal 20 may drop the PUCCH and transmit the PUSCH.

It is not necessarily required for the terminal 20 to assume a case in which a PUSCH, which collides with a PUCCH including an SL-HARQ-ACK, includes a UL-SCH and does not include a UCI, and the terminal 20 may process this case as an error case. Note that, in embodiments of the present invention, the names of the RRC parameters are not limited to sl-PriorityThresholdULURLLC and sl-PriorityThreshold, and may be any parameters that determine the priority threshold.

Figure 16:
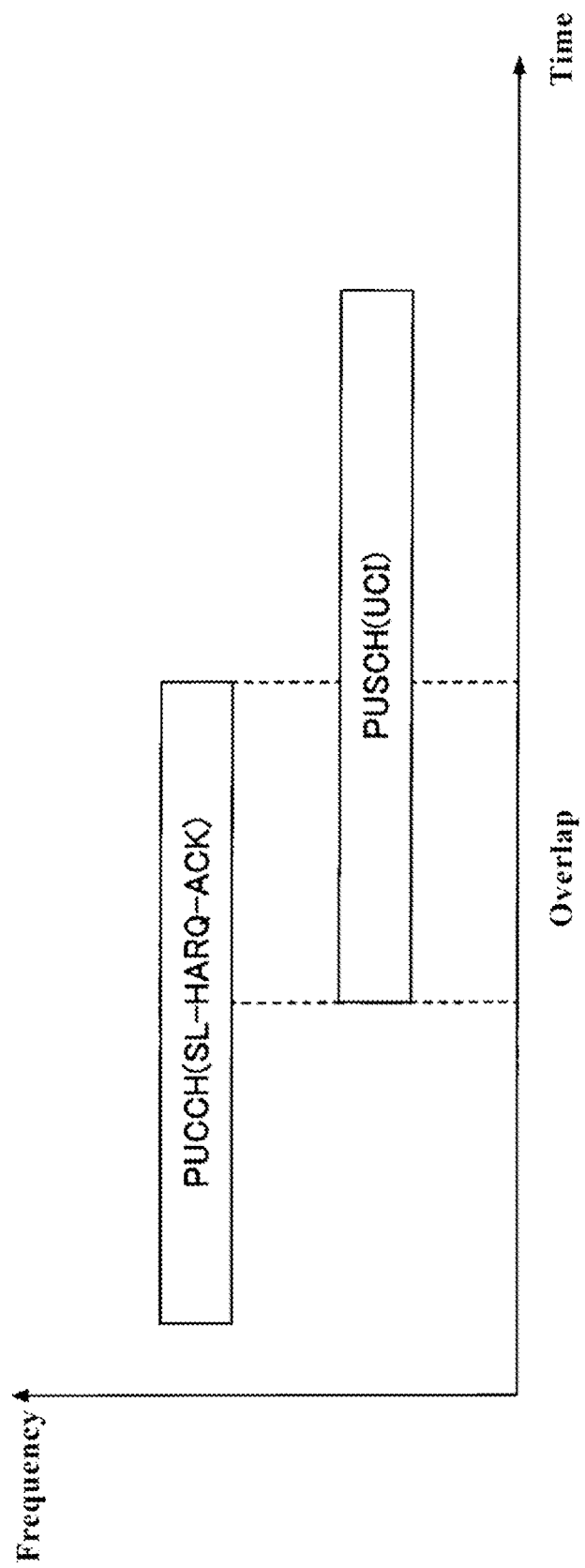
FIG. 16 is a diagram showing an example (2) of channel overlapping according to an embodiment of the present invention.

FIG. 16 is a diagram showing an example (2) of channel overlapping according to an embodiment of the present invention. As shown in FIG. 16, when a PUSCH, which collides with a PUCCH that includes an SL-HARQ-ACK, includes a UCI and does not include a UL-SCH, the terminal may multiplex the SL-HARQ-ACK with the PUSCH in step S502 shown in FIG. 14.

Further, in step S502 shown in FIG. 14, the terminal 20 may multiplex an SL-HARQ-ACK with a PUSCH when the respective priorities of: a PUCCH, or an SL-HARQ-ACK contained in the PUCCH; and a PUSCH, or a UCI contained in the PUSCH, satisfy a predetermined condition, and the terminal 20 may drop one of them when the respective priorities do not satisfy the predetermined condition.

For example, when a PUSCH has a priority index 1 in a PHY layer and the RRC parameter sl-PriorityThresholdU-LURLLC is provided, and when the smallest priority index contained in a PUCCH is smaller than sl-PriorityThresholdULURLLC, the terminal 20 may multiplex the SL-HARQ-ACK with the PUSCH, and when the smallest priority index contained in a PUCCH is not smaller than sl-PriorityThresholdULURLLC, the terminal 20 may drop the PUCCH and transmit the PUSCH.

A PUSCH may have a priority index 1 for a PHY layer, and when the RRC parameter sl-PriorityThresholdU- LURLLC has not been provided, the terminal 20 may drop the PUCCH and transmit the PUSCH.

When a PUSCH does not have a priority index 1 in a PHY layer (e.g., the priority index in a PHY layer is 0), and when the smallest priority index contained in a PUCCH is smaller than sl-PriorityThresholdULURLLC, the terminal 20 may multiplex SL-HARQ-ACK with the PUSCH, and when the smallest priority index contained in the PUCCH is not smaller than sl-PriorityThresholdULURLLC, the terminal 20 may drop the PUCCH and transmit the PUSCH.

Note that, the terminal 20 may drop at least a portion of the UC when the SL-HARQ-ACK is multiplexed with the PUSCH.

As shown in FIG. 16, when a PUSCH, which collides with a PUCCH that includes an SL-HARQ-ACK, includes a UCI and does not include a UL-SCH, a terminal 20 may drop either the PUCCH or the PUSCH in step S502 shown in FIG. 14.

For example, in step S502 shown in FIG. 14, the terminal 20 may drop either the PUCCH or the PUSCH based on the priority. For example, in step S502 shown in FIG. 14, the terminal 20 may perform prioritization between: a PUCCH or an SL-HARQ-ACK included in the PUCCH; and a PUSCH or a UCI included in the PUSCH.

For example, when a PUSCH has a priority index 1 in a PHY layer and the RRC parameter sl-PriorityThresholdULURLLC is provided, and when the smallest priority index contained in a PUCCH is smaller than sl-PriorityThresholdULURLLC, the terminal 20 may drop the PUSCH and transmit the PUCCH, and when the smallest priority index contained in the PUCCH is not smaller than sl-PriorityThresholdULURLLC, the terminal 20 may drop the PUCCH and transmit the PUSCH.

A PUSCH may have a priority index 1 for a PHY layer, and when the RRC parameter sl-PriorityThresholdULURLLC has not been provided, the terminal 20 may drop the PUCCH and transmit the PUSCH.

When a PUSCH does not have a priority index 1 in a PHY layer (e.g., the priority index in a PHY layer is 0), and when the smallest priority index contained in a PUCCH is smaller than sl-PriorityThreshold, the terminal 20 may drop the PUSCH and transmit the PUCCH, and when the smallest priority index contained in the PUCCH is not smaller than sl-PriorityThreshold, the terminal 20 may drop the PUCCH and transmit the PUSCH.

It is not necessarily required for the terminal 20 to assume a case in which a PUSCH, which collides with a PUCCH that includes an SL-HARQ-ACK, includes a UCI and does not include a UL-SCH, and the terminal 20 may process this case as an error case.

Figure 17:
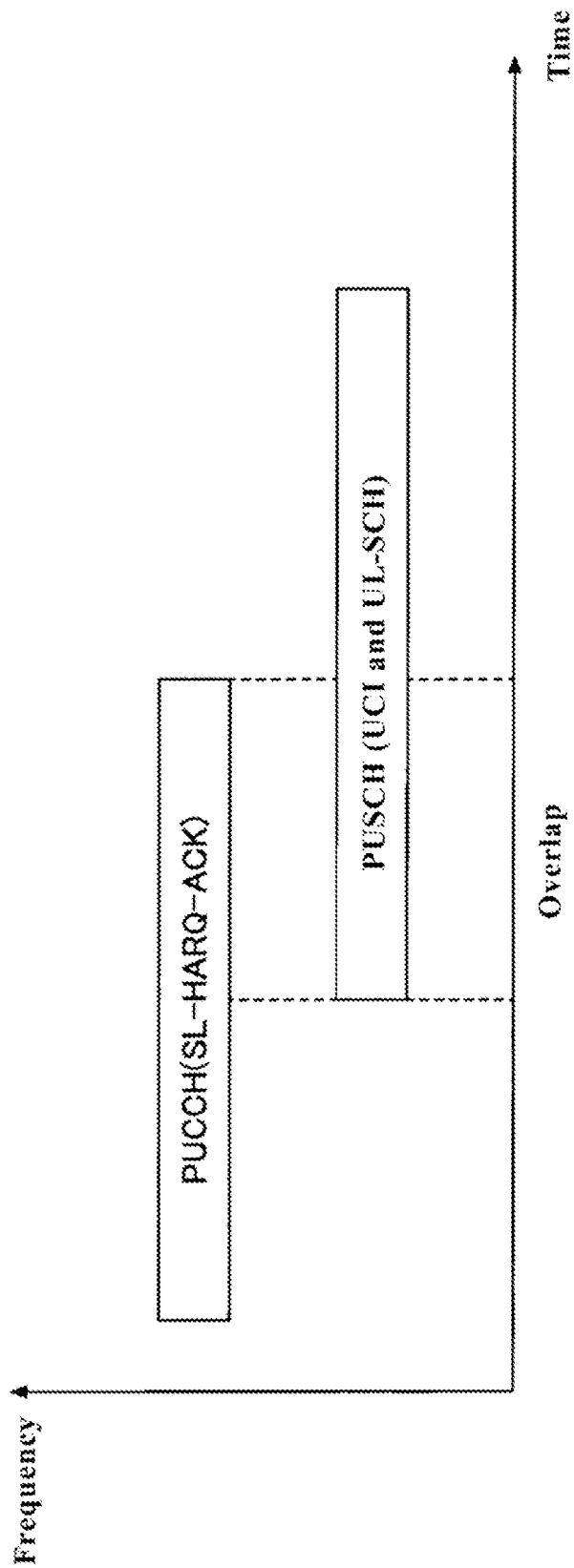
FIG. 17 is a diagram showing an example (3) of channel overlapping according to an embodiment of the present invention.

FIG. 17 is a diagram showing an example (3) of channel overlapping according to an embodiment of the present invention. As shown in FIG. 17, when a PUSCH colliding with a PUCCH that includes an SL-HARQ-ACK, includes a UL-SCH and a UCI, in step S502 shown in FIG. 14, the terminal 20 may apply the process illustrated in FIG. 15, or may apply the process illustrated in FIG. 16.

It is not necessarily required for the terminal 20 to assume a case in which a PUSCH colliding with a PUCCH that includes an SL-HARQ-ACK, includes a UCI and a UL-SCH, and the terminal 20 may process this case as an error case.

Figure 18:
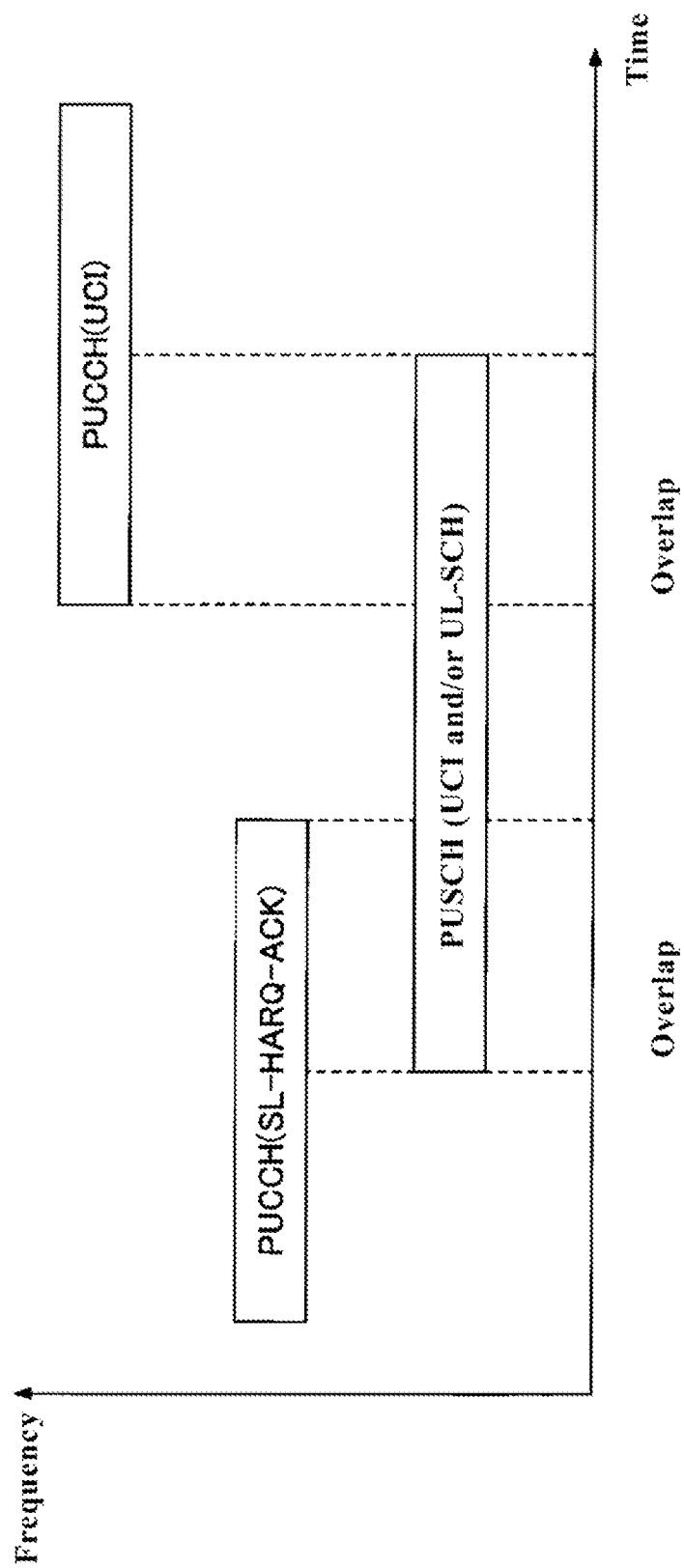
FIG. 18 is a diagram showing an example (4) of channel overlapping according to an embodiment of the present invention.

FIG. 18 is a diagram showing an example (4) of channel overlapping according to an embodiment of the present invention. As shown in FIG. 18, in a case where a PUSCH colliding with a PUCCH that includes an SL-HARQ-ACK, includes a UL-SCH and/or a UCI, and where the PUSCH further collides with another PUCCH including a UCI, and where the two PUCCHs do not collide with each another, the terminal 20, after performing prioritization between the two PUCCHs, resolves the collision between the prioritized PUCCH and the PUSCH in step S502 shown in FIG. 14. Here, in a case where a PUCCH including an SL-HARQ-ACK is prioritized, any of the processes described in FIGS. 15, 16, and 17 may be applied to resolve the collision.

Further, as shown in FIG. 18, in a case where a PUSCH colliding with a PUCCH that includes an SL-HARQ-ACK, includes a UL-SCH and/or a UCI, where another PUCCH including a UCI, collides with the PUSCH, and where the two PUCCHs do not collide with each other, in step S502 shown in FIG. 14, the terminal 20 may resolve the collision using any of the processes described in FIGS. 15, 16, and 17 when the PUCCH including the SL-HARQ-ACK and the PUSCH still collide with each other after the collision between the another PUCCH and the PUSCH is resolved.

As FIG. 18 shows, in a case where a PUSCH colliding with a PUCCH that includes an SL-HARQ-ACK, includes a UL-SCH and/or a UCI, where another PUCCH including a UCI collides with the PUSCH, and where the two PUCCHs do not collide with each other, in step S502 shown in FIG. 14, the terminal 20 may use any of the processes described in FIGS. 15, 16, and 17 to resolve the collision, and in a case where the PUSCH further includes an SL-HARQ-ACK, the terminal 20 may process the collision with the another PUCCH. In the processing of the collision, the PUCCH and the PUSCH may be replaced with each other with respect to the process shown in FIG. 16.

Further, it is not necessarily required for the terminal 20 to assume a case: where a PUSCH colliding with a PUCCH that includes an SL-HARQ-ACK, includes a UL-SCH and/or a UCI; where another PUCCH including a UCI collides with the PUSCH; and where the two PUCCHs do not collide with each other, and the terminal 20 may process this case as an error case.

Further, in a case where transmission of a PSCCH and/or a PSSCH collides with transmission of any of: a PUSCH that does not include a UL-SCH; a PUCCH that includes a DL-HARQ-ACK and/or a CSI; a PRACH; and an SRS at least in a time domain, the terminal 20 may determine a signal to be prioritized by using a predetermined method. For example, any of the following operations may be applied.

a) Prioritize a UL transmission
   b) Prioritize an SL transmission
   c) Prioritize any one of them based on priorities in a PHY layer
   d) Prioritize any one of them based on priorities in an MAC layer
   e) Prioritize any one of them based on a transmission start symbol
   f) Prioritize any one of them based on a cell index Also, it is not necessarily required for the terminal 20 to assume an occurrence of the collision, and the terminal 20 may process the collision as an error case.

According to the above embodiments of the present invention, it is possible to make clear the terminal operation in a case where a PUCCH containing an SL-HARQ-ACK overlaps with a PUSCH at least in a time domain. When a certain channel is dropped, transmission can be performed via the channel that should be prioritized. When multiplexing is performed, it can be expected that dropping of information is avoided and communication quality and latency performance are improved.

Note that, the above embodiments of the present invention may be applied to the operation of a terminal that configures or allocates the transmission resources of other terminals 20.

Note that, in an embodiment of the present invention, the terminal is not limited to a V2X terminal but may be any type of terminal that performs D2D terminal communication.

The processes described in FIG. 15, 16, or 17 may be switched to be performed, based on whether a PUCCH and/or PUSCH is dynamically scheduled channels or configured channels.

The processes described in FIG. 15, 16, or 17 may be switched to be performed, based on whether DCI corresponding to the PUCCH and/or PUSCH is present or not.

According to embodiments above, it is possible to make clear the operation of the terminal 20 in a case where a UL channel carrying an SL-HARQ-ACK overlaps with another UL channel.

In other words, it is possible to determine a process for a case in which a channel carrying a HARQ (Hybrid automatic repeat request) feedback related to a direct communication between terminals overlaps with another channel in a time domain.

(Device Configuration)

Next, an example of a functional configuration of the base station 10 and the terminal 20 that execute processes and operations described so far is described. The base station 10 and the terminal 20 have functions for performing the above embodiments. However, the base station 10 and the terminal 20 each may have only some of the functions in the embodiments.

<Base Station 10>

Figure 19:
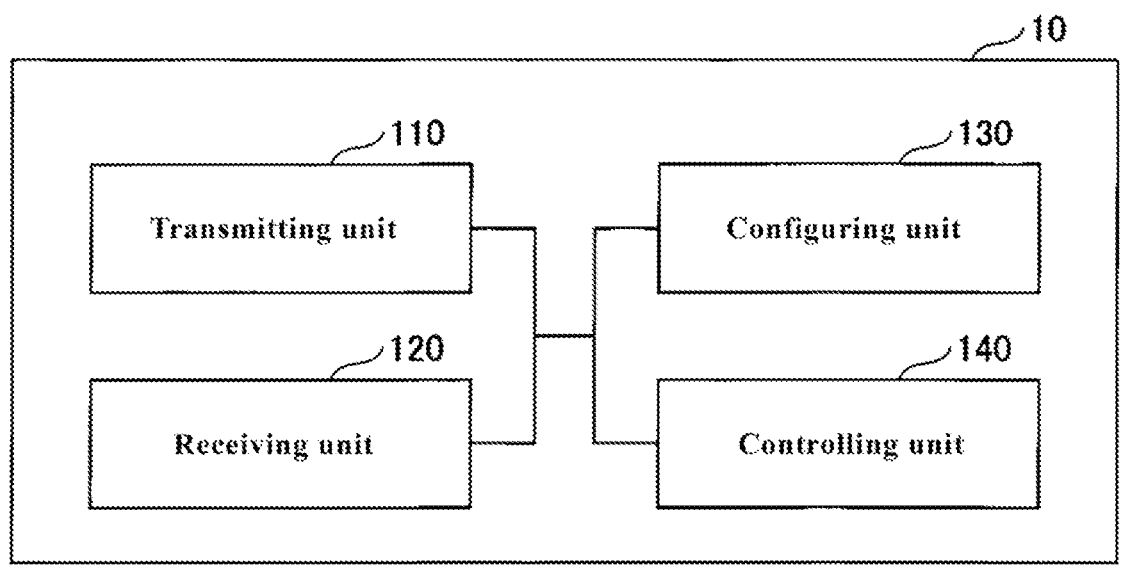
FIG. 19 is a diagram showing an example of a functional configuration of a base station 10 according to an embodiment of the present invention.

FIG. 19 is a diagram showing an example of a functional configuration of a base station 10. As shown in FIG. 19, the base station 10 has a transmitting unit 110, a receiving unit 120, a configuring unit 130 and a controlling unit 140. The functional configuration shown in FIG. 19 is only an example. Any functional classification and any functional unit name may be used as long as the operations according to the embodiments of the present invention can be performed.

The transmitting unit 110 has a function of generating a signal to be transmitted to the terminal 20 side and transmitting the signal wirelessly. The receiving unit 120 has a function of receiving various signals transmitted from the terminal 20 and acquiring information of, for example, a higher layer from the received signals. In addition, the transmitting unit 110 has a function for transmitting NR-PSS, NR-SSS, NR-PBCH, DL/UL control signals, DL reference signals, and the like, to the terminal 20.

The configuring unit 130 stores, in the storage device, the pre-configured configuration information and various configuration information to be transmitted to the terminal 20 and reads them from the storage device if necessary. The contents of the configuration information are, for example, information related to configuration of D2D communication.

The controlling unit 140 performs processing related to the settings for the terminals 20 to perform D2D communication, as described in the example. The controlling unit 140 also transmits the scheduling of D2D communication and DL communication to the terminal 20 via the transmitting unit 110. The controlling unit 140 also receives information related to HARQ responses for D2D communication and DL communication from the terminal 20 via the receiving unit 120. The functional unit related to signal transmission in the controlling unit 140 may be included in the transmitting unit 110, and the functional unit related to signal reception in the controlling unit 140 may be included in the receiving unit 120.

<Terminal 20>

Figure 20:
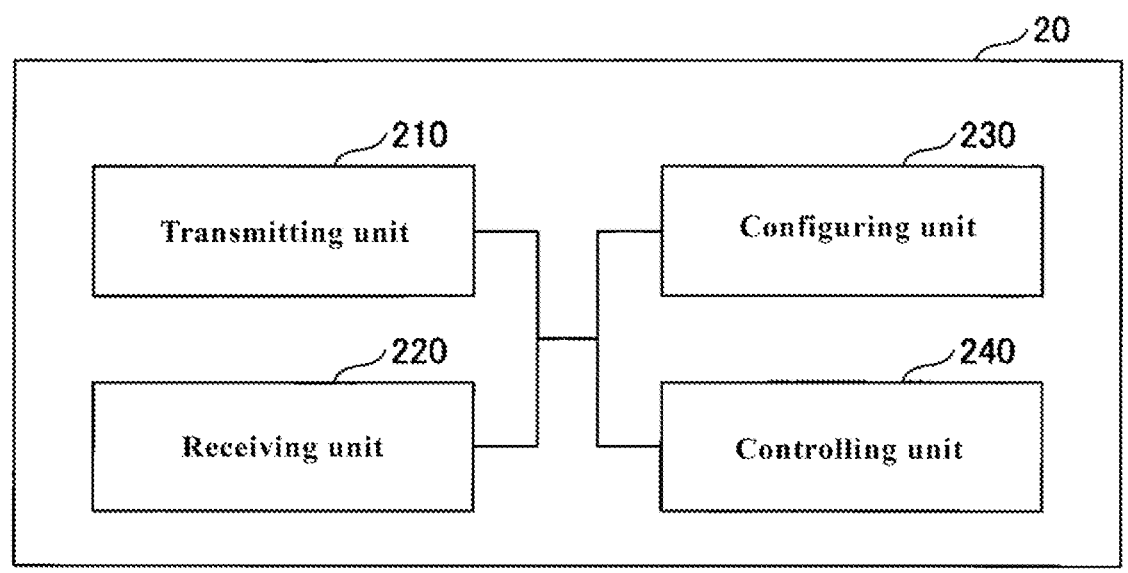
FIG. 20 is a diagram showing an example of a functional configuration of a terminal 20 according to an embodiment of the present invention.

FIG. 20 is a diagram showing an example of a functional configuration of a terminal 20. As shown in FIG. 20, the terminal 20 comprises a transmitting unit 210, a receiving unit 220, a configuring unit 230, and a controlling unit 240. The functional configuration shown in FIG. is only an example. Any functional classification and any functional unit name may be used as long as the operations according to the embodiments of the present invention can be performed.

The transmitting unit 210 generates a transmission signal from the transmission data and transmits the transmission signal wirelessly. The receiving unit 220 receives various signals wirelessly and acquires a signal of a higher layer from the received signal of a physical layer. In addition, the receiving unit 220 has a function for receiving NR-PSS, NR-SSS, NR-PBCH, DL/UL/SL control signals, or reference signals and the like transmitted from the base station 10. Further, for example, the transmitting unit 210, as D2D communication, transmits PSCCH (Physical Sidelink Control Channel), PSSCH (Physical Sidelink Shared Channel), PSDCH (Physical Sidelink Discovery Channel), PSBCH (Physical Sidelink Broadcast Channel) and the like to other terminals 20, and the receiving unit 220 receives PSCCH, PSSCH, PSDCH, PSBCH and the like from other terminals 20.

The configuring unit 230 stores, in the storage device, various configuration information received from the base station 10 or the terminal 20 via the receiving unit 220, and reads them from the storage device if necessary. The configuring unit 230 also stores pre-configured configuration information. The contents of the configuration information are, for example, information related to configuration of D2D communication.

The controlling unit 240 controls D2D communication with other terminals 20, as described in the examples. The controlling unit 240 also performs processing related to HARQ of D2D and DL communications. The controlling unit 240 also transmits, to the base station 10, the information related to the HARQ response of the D2D and DL communications scheduled from the base station 10 to the other terminals 20. The controlling unit 240 may also perform scheduling of D2D communication to the other terminals 20. Further, the controlling unit 240 may autonomously select, from a resource selection window, a resource to be used in D2D communication based on sensing results. The controlling unit 240 performs a process when D2D transmission overlaps with UL transmission. The functional unit related to signal transmission in the controlling unit 240 may be included in the transmitting unit 210, and the functional unit related to signal reception in the controlling unit 240 may be included in the receiving unit 220.

(Hardware Configuration)

Block diagrams (FIG. 19 and FIG. 20) used in the description of the embodiments above show blocks of each function unit. These functional blocks (configuration units) are achieved by any combination of at least one of hardware and software. Further, the method of achieving each functional block is not particularly limited. That is, each functional block may be achieved by using one physically or logically coupled device, by directly or indirectly (for example, in a wired or wireless manner) connecting two or more physically or logically separated devices, and by using these multiple devices. The functional block may be achieved by combining software with the one device above or the plurality of devices above.

The functions include, but are not limited to, judging, deciding, determining, computing, calculating, processing, deriving, investing, searching, confirming, receiving, transmitting, outputting, accessing, resolving, choosing, selecting, establishing, comparing, assuming, expecting, treating, broadcasting, notifying, communicating, forwarding, configuring, reconfiguring, allocating, mapping, assigning, etc. For example, a functional block (configuration unit) that makes transmission function is called a transmitting unit or a transmitter. As described above, neither of these methods is specifically limited.

Figure 21:
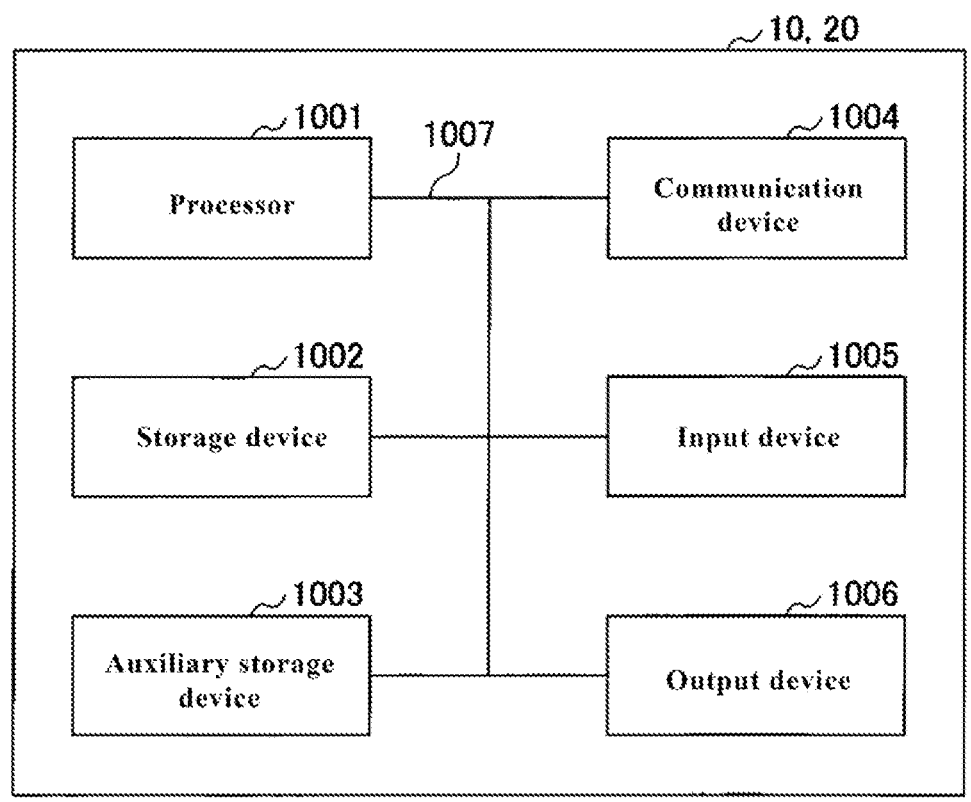
FIG. 21 is a diagram showing an example of a hardware configuration of a base station 10 or of a terminal 20 according to an embodiment of the present invention.

For example, the base station 10, the terminal 20 and the like in one embodiment of the present disclosure may function as a computer that processes the wireless communication methods of the present disclosure. FIG. 21 is a diagram showing an example of a hardware configuration of the base station 10 and the terminal 20 according to an embodiment of the present disclosure. The base station 10 and the terminal 20 above may be physically configured as a computer device including a processor 1001, a storage device 1002, an auxiliary storage device 1003, a communication device 1004, an input device 1005, an output device 1006, a bus 1007 and the like.

In the following description, term "device" can be understood as a circuit, a device, a unit and the like. A hardware configuration of the base station 10 and the terminal 20 may be configured to include one or more of the devices shown in the drawings or may be configured to not include some of the devices.

Each function in the base station 10 and the terminal 20 is achieved by the processor 1001 to perform calculation by loading a predetermined software (a program) on hardware such as the processor 1001 and the storage device 1002, by controlling communication by the communication device 1004, and by controlling at least one of reading and writing data on the storage device 1002 and the auxiliary storage device 1003.

The processor 1001, for example, operates an operating system to control the entire computer. The processor 1001 may be configured by a central processing unit (CPU) including an interface with a peripheral equipment, a control device, an arithmetic device, a register and the like. For example, the controlling unit 140, the controlling unit 240 and the like above may be achieved by the processor 1001.

Further, the processor 1001 reads a program (a program code), a software module, data and the like from at least one of the auxiliary storage device 1003 and the communication device 1004 into the storage device 1002, and performs various processes according to the program, the software module and the data. For the program, a program that causes a computer to perform at least some of the operations described in the above embodiments is used. For example, the controlling unit 140 of the base station 10 shown in FIG. 19 may be included in the storage device 1002 and achieved by a control program operated on the processor 1001. Further, for example, the controlling unit 240 of the terminal 20 shown in FIG. 20 may be included in the storage device 1002 and achieved by a control program operated on the processor 1001. Although it has been described that the various processes described above are performed by one processor 1001, these processes may be performed simultaneously or sequentially by two or more processors 1001. The processor 1001 may be implemented by one or more chips. The program may be transmitted from a network via a telecommunication line.

The storage device 1002 is a computer-readable recording medium, and may be configured by at least one of, for example, ROM (Read Only Memory), EPROM (Erasable Programmable ROM), EEPROM (Electrically Erasable Programmable ROM), and RAM (Random Access Memory). The storage device 1002 may be called a register, a cache, a main memory (a main storage device) and the like. The storage device 1002 can store a program (a program code), a software module and the like that can be operate to implement a communication method according to one embodiment of the present disclosure.

The auxiliary storage device 1003 is a computer-readable recording medium, and may be configured by at least one of, for example, an optical disk such as a CD-ROM (Compact Disc ROM), a hard disk drive, a flexible disk, an optical magnetic disk (for example, a compact disk, a digital versatile disk, Blue-ray (registered trademark) disk), a smart card, a flash memory (for example, a card, a stick, a key drive), a floppy (registered trademark) disk, and a magnetic strip. The storage medium described above may be, for example, a database, a server or other suitable mediums including at least one of the storage device 1002 and the auxiliary storage device 1003.

The communication device 1004 is hardware (a transmitting/receiving device) for communicating between computers via at least one of a wired network and a wireless network, and is also referred to as, for example, a network device, a network controller, a network card, and a communication module. The communication device 1004 may be configured to include, for example, a high frequency switch, a duplexer, a filter, and a frequency synthesizer in order to achieve at least one of frequency division duplex (FDD) and time division duplex (TDD). For example, a transmitting/receiving antenna, an amplifier unit, a transmitting/receiving unit, a transmission line interface and the like may be achieved by the communication device 1004. The transmission/receiving unit may be implemented in a physically or logically separated manner between the transmitting unit and the receiving unit.

The input device 1005 is an input device (for example, a keyboard, a mouse, a microphone, a switch, a button, and a sensor) that receives input from outside. The output device 1006 is an output device (for example, a display, a speaker, and an LED lamp) that performs output to outside. The input device 1005 and the output device 1006 may have an integrated configuration (for example, a touch panel).

Further, each device such as the processor 1001 and the storage device 1002 is connected by a bus 1007 for communicating information. The bus 1007 may be configured by using a single bus, or may be configured by using a different bus for each device.

Further, the base station 10 and the terminal 20 may be configured to include hardware such as a microprocessor, a digital signal processor (DSP), an application specific integrated circuit (ASIC), a programmable logic device (PLD), and a field programmable gate array (FPGA), and some or all of the functional blocks may be achieved by the hardware. For example, the processor 1001 may be implemented using at least one of these hardware.

(Summary of Embodiments)

As described above, according to the embodiments of the present invention, provided is a terminal having: a transmitting unit configured to transmit to a base station a first uplink control channel including a HARQ (Hybrid Automatic Repeat Request) response related to a sidelink and an uplink shared channel; and a controlling unit configured to determine a process to be applied in a case where the first uplink control channel overlaps with the uplink shared channel at least in a time domain; wherein the transmitting unit transmits to the base station the first uplink control channel or the uplink shared channel, by applying the process.

According to the configuration above, it is possible to make clear the operation of a terminal 20 for a case in which a UL channel carrying an SL-HARQ-ACK overlaps with another UL channel. In other words, it is possible to determine a process for a case in which a channel carrying a HARQ (Hybrid automatic repeat request) feedback related to a direct communication between terminals overlaps with another channel in a time domain.

The controlling unit may determine the process based on information included in the uplink shared channel. According to the configuration, it is possible for a terminal 20 to determine an operation of the terminal 20 according to information contained in another UL channel in a case where a UL channel carrying an SL-HARQ-ACK overlaps with the other UL channel.

The controlling unit may multiplex the HARQ response with the uplink shared channel in a case where the uplink shared channel includes data, and does not include control information. According to the configuration, it is possible for a terminal 20 to determine an operation of the terminal 20 according to information contained in another UL channel in a case where a UL channel carrying an SL-HARQ-ACK overlaps with the other UL channel.

In a case where the uplink shared channel includes data, and does not include control information, the controlling unit may prioritize one of the first uplink control channel and the uplink shared channel, and may drop the other, based on at least one of the priority of the first uplink control channel and the priority of the uplink shared channel. According to the configuration, it is possible for a terminal 20 to determine an operation of the terminal 20 according to information contained in another UL channel in a case where a UL channel carrying an SL-HARQ-ACK overlaps with the other UL channel.

The controlling unit may determine a process to be applied in a case where the uplink shared channel overlaps with a second uplink control channel at least in the time domain, and where the first uplink control channel does not overlap with the second uplink control channel at least in the time domain. According to the configuration, it is possible for a terminal 20 to determine an operation of the terminal 20 according to information contained in another UL channel in a case where a UL channel carrying an SL-HARQ-ACK overlaps with the other UL channel.

According to embodiments of the present invention, provided is a communication method implemented by a terminal having: transmitting to a base station an uplink control channel including a HARQ (Hybrid Automatic Repeat Request) response related to a sidelink and an uplink shared channel; determining a process to be applied in a case where the uplink control channel overlaps with the uplink shared channel at least in a time domain; and transmitting to the base station the uplink control channel or the uplink shared channel, by applying the process.

According to the configuration above, it is possible to make clear the operation of a terminal 20 in a case where a UL channel carrying an SL-HARQ-ACK overlaps with another UL channel. In other words, it is possible to determine a process for a case in which a channel carrying a HARQ (Hybrid automatic repeat request) feedback related to a direct communication between terminals overlaps with another channel in a time domain.

(Supplement to Embodiments)

Although the embodiments of the present invention have been described above, the disclosed inventions are not limited to such embodiments, and those skilled in the art will understand various modifications, corrections, alternatives, substitutions and the like. Although explanations have been provided using specific numerical examples in order to promote understanding of the present invention, these numerical values are merely examples and any appropriate values may be used unless otherwise specified. Classification of items in the above description is not essential to the present invention, and elements described in two or more items may be used in combination as necessary, and an element described in one item may be applied to another element (as long as there is no contradiction) described in other items. A boundary of the functional unit or the processing unit in the functional block diagram does not necessarily correspond to a boundary of the physical components. Operations of the plurality of functional units may be physically performed by one component, or operations of one functional unit may be physically performed by a plurality of components. For the processing procedure described in the embodiments, the processing order may be changed as long as there is no contradiction. For convenience of description of processing, although the base station 10 and the terminal 20 have been described with reference to functional block diagrams, such devices may be implemented in hardware, software, or a combination thereof. Software operated by a processor of the base station 10 according to the embodiment of the present invention and software operated by a processor of the terminal 20 according to the embodiment of the present invention respectively may be stored in a random access memory (RAM), a flash memory, a read-only memory (ROM), EPROM, EEPROM, a register, a hard disk (HDD), a removable disk, CD-ROM, a database, a server or any other suitable storage medium.

Further, the notification of information is not limited to the aspects/embodiments described in the present disclosure, and may be performed by using other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, notification information (MIB (Master Information Block)), SIB (System Information Block)), other signals or a combination thereof. Further, RRC signaling may be called an RRC message and may be, for example, an RRC connection setup message, and an RRC connection reconfiguration message.

Each aspect/embodiment described in the present disclosure may be applied to at least one of LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), a system using other suitable systems, and a next generation system expanded based on them. Further, a plurality of systems may be applied in a combination (for example, a combination of at least one of LTE and LTE-A and 5G).

The order of processing procedures, sequences, flowcharts, etc. of each aspect/embodiment described in the present specification may be changed as long as there is no contradiction. For example, the methods described in the present disclosure present elements of various steps using exemplary orders, and are not limited to the particular order presented.

The specific operation performed by the base station 10 in the present specification may be performed by its upper node in some cases. In a network consisting of one or more network nodes having the base station 10, it is obvious that various operations performed for communication with the terminal 20 are performed by the base station 10 and at least one of other network nodes (for example, MME, and S-GW, but not limited to these) other than the base station 10. In the above example, a case where there is one network node other than the base station 10 is illustrated, but other network nodes may be a combination of a plurality of the other network nodes (for example, MME and S-GW).

The information, signals, etc. described in the present disclosure may be output from an upper layer (or a lower layer) to a lower layer (or an upper layer). Input/output may be performed via a plurality of network nodes.

The input/output information and the like may be stored in a specific place (for example, a memory) or may be managed using a management table. Information to be input/output may be overwritten, updated or added. The output information and the like may be deleted. The input information and the like may be transmitted to the other device.

Determination in the present disclosure may be performed by a value represented by 1 bit (0 or 1), may be performed by a true/false value (Boolean: true or false), or may be performed by comparison of numerical values (for example, comparison with a predetermined value).

Software, whether called software, firmware, middleware, microcode, hardware description language, or other names, should be broadly interpreted to mean an instruction, an instruction set, a code, a code segment, a program code, a program, a subprogram, a software module, an application, a software application, a software package, a routine, a subroutine, an object, an executable file, an execution thread, a procedure, a feature and the like.

Further, software, an instruction, information and the like may be transmitted and received via a transmission medium. For example, if software uses at least one of wired technology (coaxial cable, optical fiber cable, twisted pair, digital subscriber line (DSL), etc.) and wireless technology (infrared, microwave, etc.) and is transmitted from a website, a server or other remote sources, at least one of these wired and wireless technologies is included within the definition of a transmission medium.

The information, signal, etc. described in the present disclosure may be represented using any of a variety of different technologies. For example, the data, the instruction, the commands, the information, the signal, the bit, the symbol, the chip, etc. may be represented by voltage, current, electromagnetic waves, magnetic field or magnetic particle, light field or photon, or any combination of these.

The terms described in the present disclosure and the terms necessary for understanding the present disclosure may be replaced with terms having the same or similar meanings. For example, at least one of the channel and the symbol may be a signal (signaling). The signal may also be a message. Further, the component carrier (CC) may be called a carrier frequency, a cell, a frequency carrier and the like.

The terms "system" and "network" used in the present disclosure are used interchangeably.

Further, the information, parameters, etc. described in the present disclosure may be represented using an absolute value, may be represented by a relative value from a predetermined value, or may be represented by other corresponding information. For example, a radio resource may be indicated by an index.

The names used for the parameters mentioned above should not be limited in any respect. Further, mathematical formulas and the like using these parameters may differ from those explicitly disclosed in the present disclosure. Since various channels (for example, PUCCH, and PDCCH) and information elements can be identified by any suitable names, various names assigned to these various channels and information elements should net be limited in any respect.

In the present disclosure, the terms "base station (BS)", "wireless base station", "base station", "fixed station", "NodeB", "eNodeB (eNB)", "gNodeB (gNB)", "access point", "transmission point", "reception point", "transmission/reception point", "cell", "sector", "cell group", "carrier", "component carrier", etc. may be used interchangeably. The base station may be called by terms such as macrocell, small cell, femtocell and picocell.

The base station can accommodate one or more (for example, three) cells. When the base station accommodates a plurality of cells, the entire base station coverage area can be divided into a plurality of smaller areas, and each of the smaller areas can provide communication service by a base station subsystem (for example, a small indoor base station (RRH: Remote Radio Head)). The term "cell" or "sector" refers to a part or the whole of at least one of the coverage area of the base station and the base station subsystem that provides communication service in this coverage.

In the present disclosure, the terms "mobile station (MS)", "user terminal", "user equipment (UE)", "terminal", etc. may be used interchangeably.

The mobile station may be called by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be called a transmission device, a reception device, a communication device and the like. At least one of the base station and the mobile station may be a device mounted on a movable body, a movable body itself and the like. The movable body may be a vehicle (for example, a car, and an airplane), may be an unmanned movable body (for example, a drone, and a self-driving car), or may be a robot (manned or unmanned). It should be noted that at least one of the base station and the mobile station includes a device that does not necessarily move during communication operation. For example, at least one of the base station and the mobile station may be IoT (Internet of Things) equipment such as a sensor.

Further, the base station in the present disclosure may be replaced by a user terminal. For example, each aspect/embodiment of the present disclosure may be applied to a configuration replaced by communication between a plurality of terminals 20 (for example, called D2D (Device-to-Device), and V2X (Vehicle-to-Everything)) for communication between the base station and the user terminal. In this case, the terminal 20 may have the function of the base station 10 described above. In addition, terms such as "upstream" and "downstream" may be replaced by terms corresponding to communication between terminals (for example, "side"). For example, an upstream channel, a downstream channel and the like may be replaced by a side channel.

Similarly, the user terminal in the present disclosure may be replaced by a base station. In this case, the base station may have the function of the user terminal described above.

A term "determining" used in the present disclosure may include a wide variety of operations. "Determining" may include "determining" judging, calculating, computing, processing, deriving, investigating, looking up, search, inquiry (for example, searching in a table, a database or another data structure) and ascertaining. "Determining" may include "determining" receiving (for example, receiving information), transmitting (for example, transmitting information), input, output and accessing (for example, accessing data in a memory). Further, "determining" may include "determining" resolving, selecting, choosing, establishing, comparing, etc. That is, "determining" may include "determining" a certain operation. Further, "determining" may be replaced by "assuming", "expecting", "considering" and the like.

Terms "connected" and "coupled" or any variation thereof refer to any direct or indirect connection or coupling between two or more elements and may include the presence of one or more intermediate elements between the two "connected" or "coupled" elements each other. Connection or coupling between the elements may be physical, logical, or a combination thereof. For example, "connection" may be replaced by "access". As used in the present disclosure, the two elements use at least one of one or more wires, cables and printed electrical connections, and as some non-limiting and non-comprehensive examples, and are considered to be "connected" or "coupled" to each other using electromagnetic energy having wavelengths in a radio frequency domain, a microwave domain and a light (both visible and invisible) domain.

The reference signal may be abbreviated as RS and may be called a pilot according to the applied standard.

"Based on" as used in the present disclosure does not mean "based only on" unless otherwise stated. In other words, the phrase "based on" means both "based only on" and "based at least on".

Any reference to the elements using designations such as "first", "second" and so on as used in the present disclosure does not generally limit the quantity or order of those elements. These designations may be used in the present disclosure as a convenient method to distinguish between two or more elements. Therefore, references to the first and second elements do not mean that only two elements can be adopted, or that the first element must somehow precede the second element.

The "means" in the configuration of each of the above devices may be replaced by a "part", a "circuit", a "device" and the like.

When "include", "including" and variations thereof are used in the present disclosure, these terms are intended to be inclusive as a term "comprising". Further, the term "or" used in the present disclosure is intended not to be exclusive.

A radio frame may be configured by one or more frames in a time domain. Each frame of the one or more frames in the time domain may be called a subframe. The subframe may further be configured by one or more slots in the time domain. The subframe may be a fixed time length (for example, 1 ms) that does not depend on numerology.

The numerology may be a communication parameter that applies to at least one of transmission and reception of a signal or a channel. The numerology may indicate at least one of, for example, a subcarrier spacing (SCS), a bandwidth, a symbol length, a cyclic prefix length, a transmission time interval (TTI), a number of symbols per TTI, a wireless frame configuration, a specific windowing process performed by a transmitter/receiver to perform in a frequency domain, and a specific window wink process for the transmitter/receiver to perform in a time domain.

The slot may be configured by one or more symbols (OFDM (Orthogonal Frequency Division Multiplexing) symbol, and SC-FDMA (Single Carrier Frequency Division Multiple Access) symbol, etc.) in the time domain. The slot may be in time units based on numerology.

The slot may include a plurality of mini slots. Each mini slot may be configured by one or more symbols in the time domain. Further, the mini slot may be called a sub slot. The mini slot may be configured by a smaller number of symbols than the slots. PDSCH (or PUSCH) transmitted in the time unit larger than the mini slot may be called PDSCH (or PUSCH) mapping type A. PDSCH (or PUSCH) transmitted using the mini slot may be called PDSCH (or PUSCH) mapping type B.

The radio frame, the subframe, the slot, the mini slot and the symbol all represent in the time unit for transmitting a signal. For the radio frame, the subframe, the slot, the mini slot and the symbol, correspondingly different names may be used.

For example, one subframe may be called a transmission time interval (TTI), a plurality of consecutive subframes may be called TTI, and one slot or one mini slot may be called TTI. That is, at least one of the subframe and TTI may be a subframe (1 ms) in existing LTE, may be a period shorter than 1 ms (for example, 1-13 symbols), or may be a period longer than 1 ms. The unit representing TTI may be called a slot, a mini slot and the like instead of the subframe.

Here, TTI refers to, for example, the minimum time unit of scheduling in wireless communication. For example, in the LTE system, the base station schedules each terminal 20 to allocate a wireless resource (a frequency bandwidth that can be used in each terminal 20, transmission power, etc.) in a TTI unit. The definition of TTI is not limited to this.

TTI may be a transmission time unit such as a channel-encoded data packet (transport block), a code block, a code word and the like, and may be a processing unit such as scheduling, link adaptation and the like. When TTI is provided, the time interval (for example, a number of symbols) to which the transport block, the code block, the code word, etc. is actually mapped may be shorter than the corresponding TTI.

When one slot or one mini slot is called TTI, one or more TTI (that is, one or more slots or one or more mini slots) may be the minimum time unit for scheduling. Further, a number of slots (a number of mini slots) configuring the minimum time unit of the corresponding scheduling may be controlled.

TTI having a time length of 1 ms may be called a usual TTI (TTI in LTE, Rel. 8-12), a normal TTI, a long TTI, a usual subframe, a normal subframe, a long subframe, a slot and the like. A TTI shorter than the normal TTI may be called a shortened TTI, a short TTI, a partial TTI (a partial or fractional TTI), a shortened subframe, a short subframe, a mini slot, a subslot, a slot and the like.

The long TTI (for example, a usual TTI and a subframe) may be replaced by a TTI having a time length of more than 1 ms, and the short TTI (for example, a shortened TTI) may be replaced by a TTI having a TTI length less than the TTI length of the long TTI and of 1 ms or more.

The resource block (RB) is a resource allocation unit in the time domain and the frequency domain and may include one or more continuous subcarriers in the frequency domain. A number of subcarriers included in RB may be the same regardless of numerology, for example, it may be 12. A number of subcarriers included in RB may be determined based on numerology.

The time domain of RB may also include one or more symbols and may be a length of one slot, one mini slot, one subframe, or one TTI. Each of one TTI, one subframe, etc. may be configured by one or more resource blocks.

One or more RBs may be called a physical resource block (PRB: Physical RB), a sub-carrier group (SCG), a resource element group (REG), a PRB pair, an RB pair and the like.

Further, the resource block may be configured by one or more resource elements (REs). For example, one RE may be a wireless resource domain of one subcarrier and one symbol.

A bandwidth part (BWP) (which may also be called a partial bandwidth) may represent a subset of consecutive common RB (common resource blocks) for a certain neurology in a certain carrier. Here, the common RB may be specified by an index of RB with respect to a common reference point of the carrier. PRB may be defined in a certain BWP and may be numbered within the corresponding BWP.

The BWPs may include a BWP for UL (UL BWP) and a BWP for DL (DL BWP). One or more BWPs may be set in one carrier for the terminal 20.

At least one of the set BWPs may be active and the terminal 20 may not be assumed to transmit/receive a predetermined signals/channel outside the active BWP. Further, the "cell", "carrier", etc. in the present disclosure may be replaced by "BWP".

The configurations of the radio frame, the subframe, the slot, the mini slot, the symbol and the like described above are merely examples. For example, configurations such as a number of subframes included in the radio frame, a number of slots per subframe or radio frame, a number of mini slots included in the slot, a number of symbols and RBs included in the slot or the mini slot, a number of subcarriers included in RB, a number of symbols in TTI, the symbol length, the cyclic prefix (CP) length can be changed in various ways.

In the present disclosure, if an article is added by translation, for example, a, an and the in English, the present disclosure may include plural nouns following these articles.

In the present disclosure, a term "A and B are different" may mean "A and B are different from each other". The term may also mean "A and B are different from C". Terms such as "separate", "combine" and the like may be interpreted in the same way as "be different".

Each aspect/embodiment described in the present disclosure may be used alone, may be used in combination, or may be used by switching according to performance. Further, a notification of predetermined information (for example, a notification of "being X") is not limited to an explicit one, and may be performed implicitly (for example, the notification of the predetermined information is not performed).

Note that, PUCCH according to the present disclosure is an example of uplink control channel. A PUSCH is an example of an uplink shared channel. A UL-SCH is an example of data. A UCI is an example of control information.

Although the present disclosure has been described in detail above, it is clear to those skilled in the art that the present disclosure is not limited to the embodiments described in the present disclosure. The present disclosure may be implemented as amendment and modification aspects without departing from the spirit and scope of the present disclosure, which are determined by the description of the scope of claims. Therefore, description of the present disclosure is for purposes of illustration and does not have any limiting meaning to the present disclosure.

EXPLANATION OF REFERENCE NUMERALS

10 Base station
110 Transmitting unit
120 Receiving unit
130 Configuring unit
140 Controlling unit
20 Terminal
210 Transmitting unit
220 Receiving unit
230 Configuring unit
240 Controlling unit
1001 Processor
1002 Storage device
1003 Auxiliary storage device
1004 Communication device
1005 Input device
1006 Output device

The invention claimed is:

1. A terminal comprising:
a transmitting unit configured to transmit an uplink shared channel to a base station; and
a controlling unit configured to perform determination of control of, when transmission of the uplink shared channel overlaps with transmission of an uplink control channel including a response related to retransmission control of direct communication between terminals,
multiplexing the response with the uplink shared channel, or
performing no transmission of the uplink control channel including the response to the base station,
wherein the determination to multiplex the response with the uplink shared channel or to perform no transmission of the uplink control channel including the response to the base station is based on a priority of the uplink shared channel,
wherein upon detecting that a priority of the uplink shared channel is lower than a priority of the uplink control channel, and that the uplink shared channel does not include uplink control information, the controlling unit multiplexes the response with the uplink shared channel,
wherein upon detecting that a priority of the uplink shared channel is lower than a priority of the uplink control channel, and that the uplink shared channel includes uplink control information, the controlling unit does not multiplex the response with the uplink shared channel,
wherein the response related to retransmission control of direct communication between terminals comprises a sidelink HARQ-ACK, and
wherein in a case where the priority of the uplink shared channel is higher than the priority of the uplink control channel, the controlling unit performs control of no transmission of the uplink control channel including the response to the base station.

2. The terminal according to claim 1, wherein:
in a case where a priority of the uplink shared channel is lower than a priority of the uplink control channel, if the uplink shared channel does not include uplink control information, the controlling unit multiplexes the response with the uplink shared channel.

3. The terminal according to claim 1, wherein the controlling unit does not assume that the uplink control channel including the response overlaps with an uplink shared channel including channel state information (CSI).

4. A communication method performed by a terminal, the communication method includes:
   transmitting an uplink shared channel to a base station; and
   performing determination of control of, when transmission of the uplink shared channel overlaps with transmission of an uplink control channel including a response related to retransmission control of direct communication between terminals,
      multiplexing the response with the uplink shared channel, or
      performing no transmission of the uplink control channel including the response to the base station,
      wherein the determination to multiplex the response with the uplink shared channel or to perform no transmission of the uplink control channel including the response to the base station is based on a priority of the uplink shared channel,
      wherein upon detecting that a priority of the uplink shared channel is lower than a priority of the uplink control channel, and that the uplink shared channel does not include uplink control information, the response is multiplexed with the uplink shared channel,
      wherein upon detecting that a priority of the uplink shared channel is lower than a priority of the uplink control channel, and that the uplink shared channel includes uplink control information, the response is not multiplexed with the uplink shared channel,
      wherein the response related to retransmission control of direct communication between terminals comprises a sidelink HARQ-ACK, and
      wherein in a case where the priority of the uplink shared channel is higher than the priority of the uplink control channel, performing control of no transmission of the uplink control channel including the response to the base station.

5. A communication system comprising: a terminal; and a base station, wherein:
   the terminal:
      transmits an uplink shared channel to a base station, and
      performs determination of control of, when transmission of the uplink shared channel overlaps with transmission of an uplink control channel including a response related to retransmission control of direct communication between terminals,
         multiplexing the response with the uplink shared channel, or
         performing no transmission of the uplink control channel including the response to the base station,
         wherein the determination to multiplex the response with the uplink shared channel or to perform no transmission of the uplink control channel including the response to the base station is based on a priority of the uplink shared channel,
         wherein upon detecting that a priority of the uplink shared channel is lower than a priority of the uplink control channel, and that the uplink shared channel does not include uplink control information, the terminal multiplexes the response with the uplink shared channel,
         wherein upon detecting that a priority of the uplink shared channel is lower than a priority of the uplink control channel, and that the uplink shared channel includes uplink control information, the controlling unit does not multiplex the response with the uplink shared channel, and
         wherein the response related to retransmission control of direct communication between terminals comprises a sidelink HARQ-ACK,
         wherein in a case where the priority of the uplink shared channel is higher than the priority of the uplink control channel, performing control of no transmission of the uplink control channel including the response to the base station, and
   the base station receives the uplink shared channel and the uplink control channel.

* * * * *